(12) United States Patent
Nishimura

(10) Patent No.: US 8,591,327 B2
(45) Date of Patent: Nov. 26, 2013

(54) GAME MACHINE AND DATA STORAGE MEDIUM HAVING GAME PROGRAM STORED THEREIN

(75) Inventor: Katsuhito Nishimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2121 days.

(21) Appl. No.: 10/833,132

(22) Filed: Apr. 28, 2004

(65) Prior Publication Data

US 2004/0224759 A1    Nov. 11, 2004

(30) Foreign Application Priority Data

May 9, 2003   (JP) ................................. 2003-132276

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ................... 463/31; 463/22; 463/32; 463/34; 463/43

(58) Field of Classification Search
USPC ................. 463/22, 31, 32, 34, 43, 6
See application file for complete search history.

(56) References Cited

U.S. PATENT DOCUMENTS

| | | | | |
|---|---|---|---|---|
| 5,616,079 A | * | 4/1997 | Iwase et al. | 463/32 |
| 5,774,125 A | * | 6/1998 | Suzuoki et al. | 345/582 |
| 6,007,423 A | * | 12/1999 | Nakamura | 463/6 |
| 6,123,619 A | * | 9/2000 | Tokita et al. | 463/43 |
| 6,133,923 A | * | 10/2000 | Ozawa | 345/582 |
| 6,213,878 B1 | | 4/2001 | Setsumasa et al. | |
| 6,371,856 B1 | * | 4/2002 | Niwa | 463/43 |
| 6,699,194 B1 | * | 3/2004 | Diab et al. | 600/481 |
| 6,973,529 B2 | * | 12/2005 | Casper et al. | 710/316 |
| 2003/0058238 A1 | * | 3/2003 | Doak et al. | 345/419 |

FOREIGN PATENT DOCUMENTS

| | | |
|---|---|---|
| JP | 11-144087 | 5/1999 |
| JP | 2000-107441 | 4/2000 |
| JP | 3270929 | 1/2002 |

OTHER PUBLICATIONS

Ohta, "Rouge Clone 2, Japanese version", Aug. 27, 1989, URL, http://www.vector.co.jp/soft/dos/game/se000996.html, http://my.vector.co.jp/servlet/System.FileDownload/download/http/0/996/pack/dos/game/rpg/jrog13so.lzh.
Faria, "Jarulf's Guide to Diablo and Hellfire" version 1.62 (2001).
"The Lurker Lounge", www.lurkerlounge.com.
"Diablo Video Game", http://en.wikipedia.org/wiki/Diablo_(computer_game).
Office Action dated Oct. 20, 2006 issued in a related Japanese application.
"Dragon Quest Official Guide Book," ENIX Corporation, Oct. 1, 1988, first edition, pp. 49.

* cited by examiner

*Primary Examiner* — Adetokunbo O Torimiro
(74) *Attorney, Agent, or Firm* — Nixon & Vanderhye P.C.

(57) ABSTRACT

If a random number is larger than a selection coefficient SF, a room unit RU is given a high priority for disposition in a map area. If the random number is not larger than the selection coefficient, no room unit is disposed on the map area. Also, if a selected open door is a door set in a room unit, the selection coefficient is multiplied by a multiplication factor, and then the multiplication result and the random number are compared. As the multiplication factor is larger, a passage unit is given a higher priority for disposition on the map area. By adjusting the selection coefficient and the multiplication factor, it is possible to generate a map in consideration of a ratio of units of two types to be disposed on the map area and an affinity between these units for connection.

26 Claims, 15 Drawing Sheets

F I G. 5

ROOM UNIT TABLE

| ROOM UNIT | SIZE | DOOR | | | | | | SLOT | | | |
|---|---|---|---|---|---|---|---|---|---|---|---|
| | | DR1 | DR2 | DR3 | DR4 | DR5 | ... | Ss | Sg | Se | Si |
| RUa | 4×4 | a2 | b2 | c4 | d2 | — | — | 2 | 1 | 1 | 1 |
| RUb | 4×4 | a3 | b2 | c2 | c4 | d3 | — | 0 | 1 | 2 | 1 |
| RUc | 4×4 | a2 | c3 | — | — | — | — | 0 | 1 | 1 | 1 |
| RUd | 4×4 | c3 | — | — | — | — | — | 3 | 1 | 0 | 1 |
| ... | ... | ... | ... | ... | ... | ... | ... | ... | ... | ... | ... |

F I G. 7

PASSAGE UNIT TABLE

| PASSAGE UNIT | SIZE | DOOR | | | | |
| --- | --- | --- | --- | --- | --- | --- |
| | | DR1 | DR2 | DR3 | DR4 | ... |
| RUa | 1×1 | a1 | c1 | — | — | — |
| RUb | 1×1 | d1 | c1 | — | — | — |
| RUc | 1×1 | a1 | b1 | c1 | d1 | — |
| RUd | 1×1 | d1 | b1 | c1 | — | — |
| ⋮ | ⋮ | ⋮ | ⋮ | ⋮ | ⋮ | ⋮ |

F I G. 8

CAP UNIT TABLE

| CAP UNIT | SIZE | DOOR | |
| --- | --- | --- | --- |
| | | DR1 | ... |
| CU | 1×1 | c1 | — |
| ⋮ | ⋮ | ⋮ | ⋮ |

F I G. 1 2
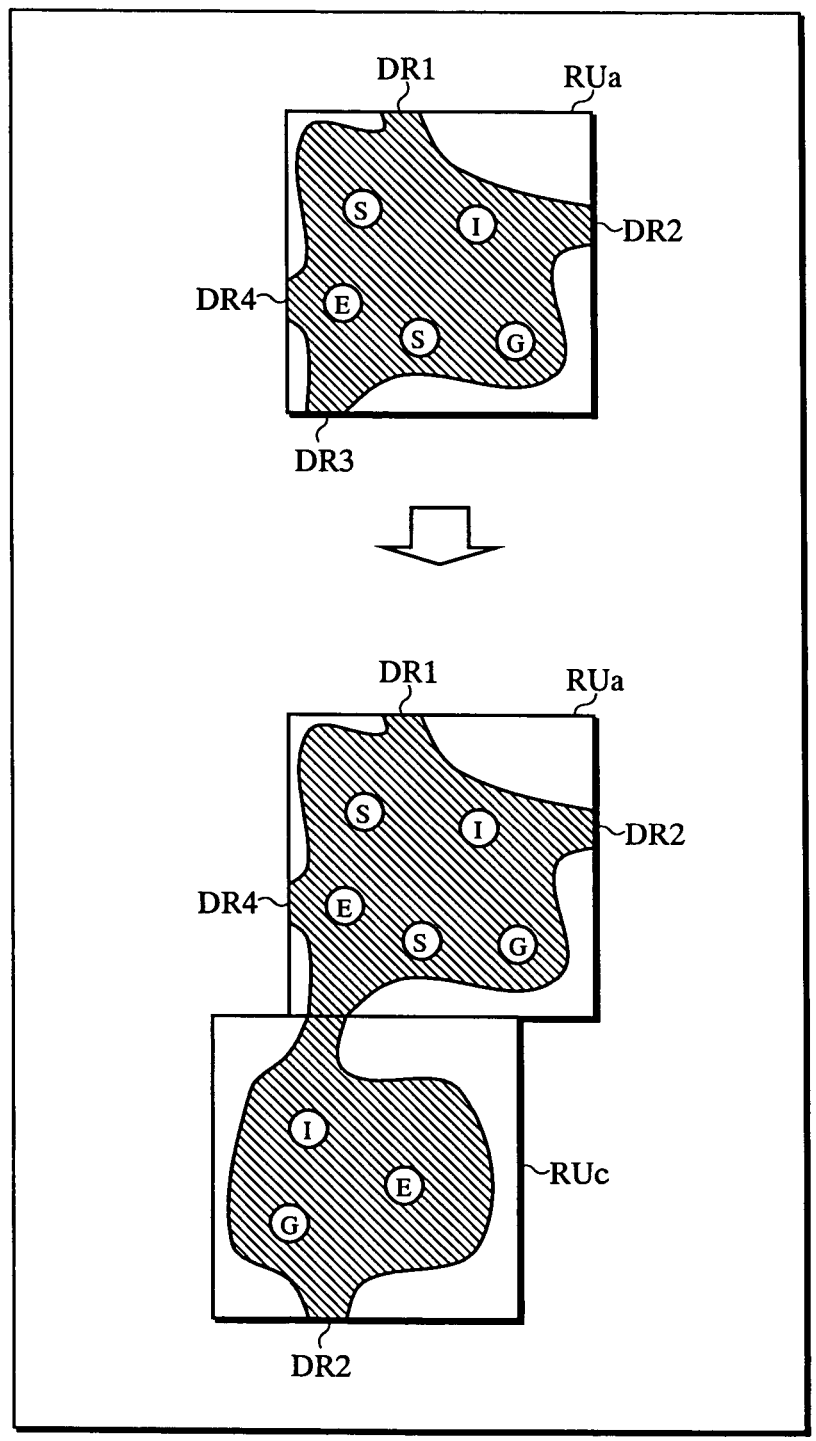

250
GAME MACHINE AND DATA STORAGE MEDIUM HAVING GAME PROGRAM STORED THEREIN

FIELD

The technology herein relates to game machines and data storage mediums having stored therein a game program and, more particularly, to a game machine and a data storage medium having stored therein a game program for connecting units of a plurality of types to automatically generate a map.

BACKGROUND AND SUMMARY

Conventionally, various games have been developed in which a player object operated by a player is moving on a map or a course. In order to enhance the diversity of games, it is desirable to provide the player with a plurality of such maps or courses. In conventional game machines, such maps or courses are automatically generated.

In an image generating device disclosed in Japanese Patent Laid-Open Publication No. 11-144087 (1999-144087), a course for a race game or the like is automatically generated. Specifically, crucial parts, such as overhead crossings or straights, are first disposed, and course parts are then randomly selected and disposed, thereby generating a course. In a game machine disclosed in Japanese Patent Laid-Open Publication No. 2000-107441, a map is extracted depending on the degree of difficulty of a game. Specifically, a plurality of patterns of maps with rooms and passages disposed in advance thereon are provided, and one of these patterns is extracted depending on the degree of difficulty of the game. In a video game machine disclosed in Japanese Patent No. 3270929, a maze is automatically generated. Specifically, a main passage is first disposed, and then branching passages are generated and rooms are disposed at their dead ends to generate a maze.

However, the above conventional techniques have the following problems.

(1) In Japanese Patent Laid-Open Publication No. 11-144087 (1999-144087), a closed circular course used in a race game or the like is generated. Therefore, parts other than course parts, such as rooms, are difficult to set, which makes it impossible to set dead ends and branching passages.

(2) In Japanese Patent Laid-Open No. 2000-107441, selection is made from the fixed maps set. Therefore, random diversity is limited.

(3) In Japanese Patent No. 3270929, rooms are provided only to the dead ends of the branching passages. Therefore, rooms are not generated at, for example, some point on any passages. Thus, map diversity that could be achieved by a combination of passages and rooms is limited.

As described above, the map and the course in the conventional art lack diverse elements including elements of randomness. Moreover, maps and courses that can be generated are limited.

Alternatively, a map can be generated by randomly combining units of a plurality of types. Of these units of the plurality of types, some are preferably disposed relatively more, but some are preferably disposed relatively less. However, there have been no techniques so far in consideration of a ratio of the units of two types. Moreover, of these units, some are preferably adjacent to each other, but some are preferably not. However, there have been no techniques so far of randomly combining units in consideration of an affinity between adjacent units.

Therefore, a feature of an exemplary illustrative embodiment is to provide a game machine and a storage medium having stored therein a game program for automatically generating a map with diverse elements including elements of randomness in consideration of a ratio of units of two types and an affinity between adjacent units.

In order to achieve the above feature, the exemplary illustrative embodiments have features as described below.

A first aspect of the exemplary illustrative embodiment is directed to a game machine for generating a game map which defines an area where an object can move in the course of a game. The game machine includes unit storage means (which exemplarily corresponds to, in a preferred embodiment, a unit storage area 322), first disposing means (which exemplarily corresponds to, in the preferred embodiment, a CPU 31 executing steps S2 and S3; only step numbers are hereinafter shown), and second disposing means (S1, S4, S5, S6). The unit storage means has previously stored therein a first unit (passage unit PU), which is a unit zone including at least one connecting portion (door DR) and forming the game map, and a second unit (room unit RU), which is a unit zone including at least one connecting portion and is different in type from the first unit. The first disposing means selects one unit from the first unit and the second unit that are stored in the unit storage means, and disposes the selected unit on the map area. The second disposing means repeats a process of selecting a unit which is connectable to an unconnected connecting portion included in a unit already disposed on the map area and a process of disposing the selected unit on the map area. The second disposing means includes unconnected connecting portion extracting means (S4, S51, S71), random number generating means (S52), selection coefficient setting means (S1), unit selecting means (S53 through S61), and unit disposing means (S62). The unconnected connecting portion extracting means extracts the unconnected connecting portion from the connecting portions included in the unit already disposed on the map area. The random number generating means generates a random number within a predetermined range. The selection coefficient setting means sets a selection coefficient (selection coefficient SF) to the connecting portion extracted by the unconnected connecting portion extracting means. The unit selecting means compares the random number generated by the random number generating means with the selection coefficient based on predetermined criteria, and selects either one unit from the first unit and the second unit. The unit disposing means extracts the one unit selected by the unit selecting means from the first unit and the second unit stored in the unit storage means, connects a connecting portion included in the one unit to the connecting portion extracted by the unconnected connecting portion extracting means, and disposes the one unit on the map area. Here, the first unit and the second unit are units of different types, and various types of these units can be thought. In a first example, the first unit is a unit representing a passage on the game map, and the second unit is a unit representing a room. In a second example, the second unit is a unit where game components (enemy characters, items, a starting point, a goal point, etc.) can be disposed, and the first unit is a unit where such game components cannot be disposed. In a third example, the first unit is a unit having a relatively small size, and the second unit is a unit having a relatively large size. In a fourth example, the first unit and the second unit have different shapes.

According to the structure of an exemplary illustrative embodiment, it is possible to automatically generate a map with diverse elements including units of a plurality of types selected based on the random number. Also, by appropriately setting the selection coefficient, units of different types can be disposed on the map area at a desired ratio. By way of example, if the first unit is selected when the generated random number is smaller than the selection coefficient, and the selection coefficient is set so as to have a value larger than a median value of a range of possible random numbers, the ratio of disposition of the first unit on the map area is increased. Furthermore, with the selection coefficient being set as such, the possibility that a plurality of first units are successively connected for disposition is increased, and the possibility that a plurality of second units are successively connected for disposition is decreased. As such, by varying the value of the selection coefficient with respect to the range of the possible random numbers, it is possible to generate a map with diverse elements in consideration of a ratio of disposition based on the unit type and an affinity between adjacent units. Furthermore, a new unit is connected to the connecting portion of the unit that has been already disposed, thereby preventing an inconvenience of causing the map to be divided into plural areas.

For example, the first unit is a unit zone representing a passage (passage area PZ) on the game map, and the second unit is a unit zone (room zone RZ) representing a room having an area larger than an area of the first unit on the game map. With this, it is possible to generate a map with diverse elements including the rooms and the passages forming the game at a desired ratio. For example, by appropriately setting the value of the selection coefficient with respect to the range of possible random values, the possibility of generating a map in which rooms are successively connected for disposition can be decreased. Also, it is possible to reduce the possibility that additionally disposed components, such as a starting point, a goal point, enemy characters, and items, which are generally disposed in a room on the game map, are concentrated on the game map.

By way of example, the selection coefficient setting means sets different selection coefficients (selection coefficient SF×multiplication factor M) based on a type of a unit including the connecting portion extracted by the unconnected connecting portion extracting means. With this, the possibility that one of the first and second units is connected to the other unit for disposition can be controlled. For example, it is possible to generate a map in which a first unit is more likely to be connected to a second unit for disposition and a first unit and a second unit are equally likely to be connected to a second unit. That is, it is possible to generate a map in consideration of a connection affinity between units of two types. In another example, the selection coefficient setting means sets different selection coefficients based on the connecting portion extracted by the unconnected connecting portion extracting means. With this, the type of the unit connected to each connecting portion included in the unit can be controlled. Therefore, it is possible to generate a map in further consideration of an affinity between units.

Also, the unit storage means may have previously stored therein a first unit group (passage unit image group) formed by a plurality of the first units and a second unit group (room unit image group) formed by a plurality of the second units. In this case, the unit selecting means compares the random number with the selection coefficient based on the predetermined criteria, and selects one unit group from the first unit group and the second unit group. The unit disposing means then extracts a unit from the one unit group selected by the unit selecting means from the first unit group and the second unit group, and disposes the extracted unit on the map area. Thus, with a plurality of first units and second units being provided, it is possible to generate a map with further diverse elements.

For example, in some cases, the connecting portion included in the one unit selected by the unit selecting means cannot be connected to the connecting portion extracted by the unconnected connecting portion extracting means for disposing the one unit on the map area (No in step S54). In such cases, the unit disposing means may extract another one unit the first unit and the second unit (S56, S57), connect a connecting portion included in the other unit to the connecting portion extracted by the unconnected connecting portion extracting means, and dispose the other unit on the map area (S62). With this, it is possible to prevent generation of a map with a connecting portion left unconnected because no other portion can be connected to the unconnected connecting portion. Also, in some cases, the connecting portion included in the other unit cannot be connected to the connecting portion extracted by the unconnected connecting portion extracting means for disposing the other unit on the map area (No in step S56 or No in step S59). In such cases, the unit disposing means may close the connecting portion extracted by the unconnected connecting portion extracting means (cap unit CU, S58, S61, S62). With this, the connecting portion at which no unit can be disposed is closed, thereby preventing generation of a map with a connecting portion left unconnected.

Also, in one case, after the number of second units disposed by the first and second disposing means on the map area has reached a predetermined number, the second disposing means may stop disposing the second unit on the map area. In another case, third disposing means (S73, S74) may be further provided. When the number of second units disposed by the first and second disposing means on the map area has reached a predetermined number (S6), the third disposing means extracts the first unit stored in the unit storage means, connects a connecting portion included in the first unit to the connecting portion extracted by the unconnected connecting portion extracting means, and disposes the first unit on the map area. In either case, a map can be generated with the number of second units to be disposed on the map area being set. Also, when there is another unconnected connecting portion within a predetermined area (zone Z) on the map area with reference to the connecting portion extracted by the unconnected connecting portion extracting means (S72), the third disposing means may dispose the first unit to connect the extracted connecting portion and the other unconnected connecting portion together via the first unit (S73). When there is no other unconnected connecting portion within the predetermined area on the map area, the third disposing means may close the connecting portion extracted by the unconnected connecting portion extracting means (S74). With this, it is possible to prevent generation of a map with a connecting portion left unconnected. Also, when there is a plurality of unconnected connecting portions and these connecting portions are relatively close to each other, these connecting portions are connected via the first unit. Therefore, a map with diverse elements can be generated. Furthermore, a map with a predetermined number of second units being combined as one and disposed on the map area can be generated.

A second aspect of an exemplary illustrative embodiment is directed to a storage medium having stored therein a game program causing a computer to perform a process of generating a game map which defines an area where an object can move in the course of a game. The computer has previously stored therein (unit storage area 322) a first unit, which is a unit zone including at least one connecting portion and forming the game map, and a second unit, which is a unit zone including at least one connecting portion and is different in type from the first unit. The game program stored in the storage medium causes the computer to perform the process including a first disposing step (S2, S3) and a second disposing step (S1, S4, S5, S6). In the first disposing step, one unit is selected from the previously-stored first unit and the second unit, and the selected unit is disposed on the map area. In the second disposing step, a process of selecting a unit which is connectable to an unconnected connecting portion included in a unit already disposed on the map area and a process of disposing the selected unit on the map area are repeated. The second disposing step includes: an unconnected connecting portion extracting step (S4, S51, S71), a random number generating step (S52), a selection coefficient extracting step (S1), a unit selecting step (S53 through S61), and a unit disposing step (S62). In the unconnected connecting portion extracting step, the unconnected connecting portion is extracted from the connecting portions included in the unit already disposed on the map area. In the random number generating step, a random number is generated within a predetermined range. In the selection coefficient setting step, a selection coefficient is set to the connecting portion extracted in the unconnected connecting portion extracting step. In the unit selecting step, the random number generated in the random number generating step is compared with the selection coefficient based on predetermined criteria, and either one unit from the first unit and the second unit is selected. In the unit disposing step, the one unit selected in the unit selecting step is extracted from the first unit and the second unit previously stored, a connecting portion included in the one unit is connected to the connecting portion extracted in the unconnected connecting portion extracting step, and the one unit is disposed on the map area. According to the structure of the exemplary illustrative embodiment, effects similar to those obtained from the above game machine can be obtained even from a computer executing a game program stored in the storage medium.

For example, the first unit is a unit zone representing a passage on the game map, and the second unit is a unit zone representing a room having an area larger than an area of the first unit on the game map.

In one example, in the selection coefficient setting step, different selection coefficients are set based on a type of a unit including the connecting portion extracted in the unconnected connecting portion extracting step. In another example, in the selection coefficient setting step, different selection coefficients are set based on the connecting portion extracted in the unconnected connecting portion extracting step.

Also, the computer may have previously stored therein a first unit group formed by a plurality of the first units and a second unit group formed by a plurality of the second units. In this case, in the unit selecting step, the random number is compared with the selection coefficient based on the predetermined criteria, and one unit group is selected from the first unit group and the second unit group. In the unit disposing step, a unit is extracted from the one unit group selected in the unit selecting step from the first unit group and the second unit group, and the extracted unit is disposed on the map area.

For example, in some cases, the connecting portion included in the one unit selected in the unit selecting step cannot be connected to the connecting portion extracted in the unconnected connecting portion extracting step for disposing the one unit on the map area. In such cases, in the unit disposing step, another one unit may be extracted from the first unit and the second unit, a connecting portion included in the other unit may be connected to the connecting portion extracted in the unconnected connecting portion extracting step, and the other unit may be disposed on the map area.

Furthermore, in some cases, the connecting portion included in the other unit cannot be connected to the connecting portion extracted in the unconnected connecting portion extracting step for disposing the other unit on the map area. In such cases, in the unit disposing step, the connecting portion extracted in the unconnected connecting portion extracting step may be closed.

In the second disposing step, after the number of second units disposed in the first and second disposing steps on the map area has reached a predetermined number, disposing the second unit on the map area may be stopped. Also, the game program may further cause the computer to perform a third disposing step (S73, S74). In the third disposing step, when the number of second units disposed in the first and second disposing steps on the map area has reached a predetermined number, the previously-stored first unit is extracted, a connecting portion included in the first unit is connected to the connecting portion extracted by the unconnected connecting portion extracting step, and the first unit is disposed on the map area. Also, in the third disposing step, when there is another unconnected connecting portion within a predetermined area on the map area with reference to the connecting portion extracted in the unconnected connecting portion extracting step, the first unit may be disposed to connect the extracted connecting portion and the other unconnected connecting portion together via the first unit. In the third disposing step, when there is no other unconnected connecting portion within the predetermined area on the map area, the connecting portion extracted in the unconnected connecting portion extracting step may be closed.

BRIEF DESCRIPTION OF THE DRAWINGS

These and other features and advantages will be better and more completely understood by referring to the following detailed description of exemplary non-limiting illustrative embodiment in conjunction with the drawings of which:

FIG. 5 is an illustration showing one non-limiting example of a room unit table stored in the unit storage area 322 of FIG. 3;

FIG. 7 is an illustration showing one non-limiting example of a passage unit table stored in the unit storage area 322 of FIG. 3;

FIG. 8 is an illustration showing one non-limiting example of a cap unit table stored in the unit storage area 322 of FIG. 3;

FIG. 12 is an illustration showing one non-limiting example in which a door DR3 of the room unit RUa disposed on a map area and is selected as a selected door, and the selected door is connected to a door DR1 of the room unit RUc for disposition;

DETAILED DESCRIPTION

Figure 1:
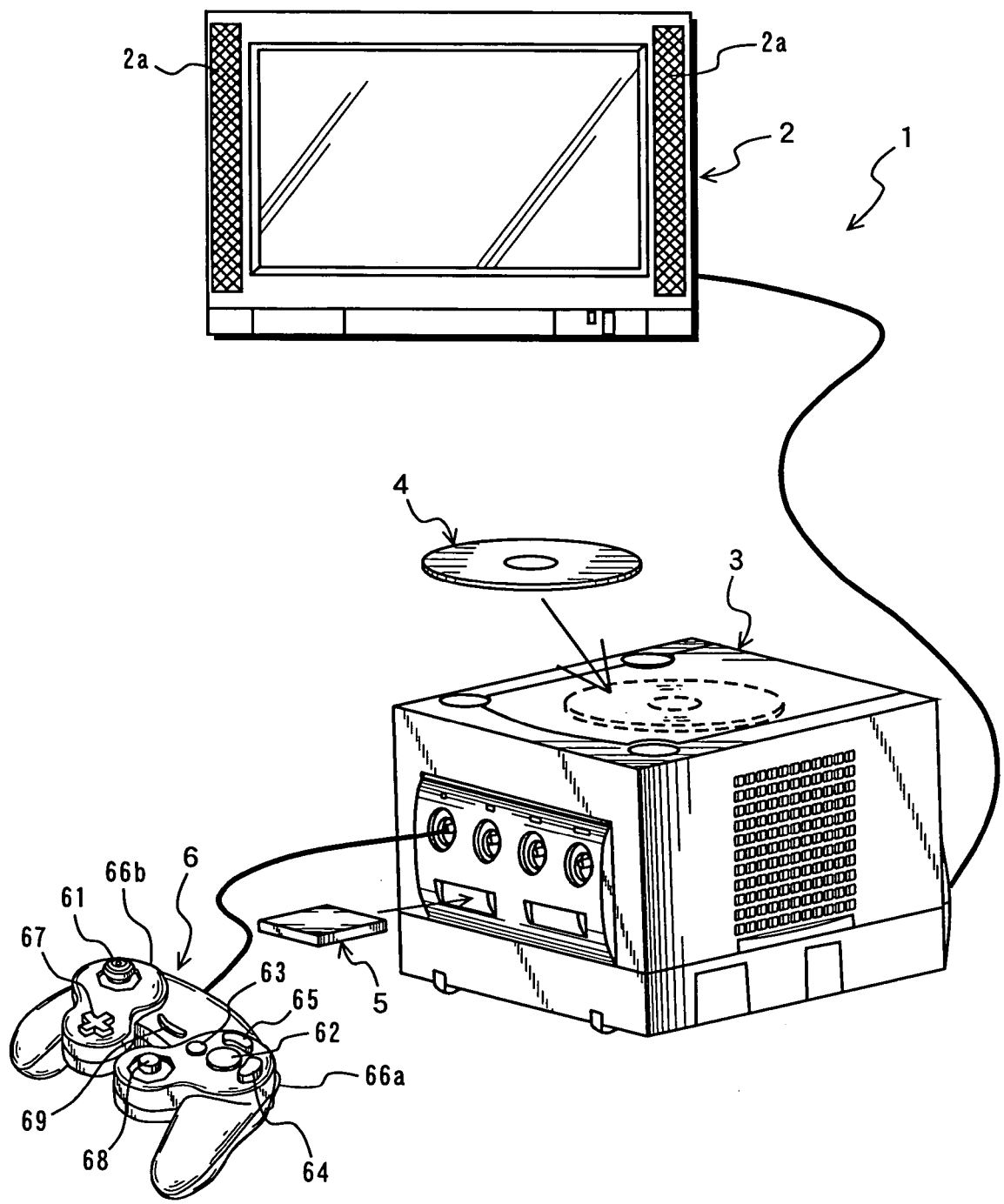
FIG. 1 is an exemplary illustrative external view for describing a game system 1 according to one embodiment.

With reference to FIG. 1, a game system 1 according to one exemplary illustrative embodiment is described below. FIG. 1 is an external view of the game system 1. Hereinafter, the exemplary illustrative embodiment is described by taking a non-portable game machine as an example.

In FIG. 1, the game system 1 is configured such that a non-portable game machine 3 is connected via a connection code 2a to a Cathode Ray Tube (CRT) display (hereinafter referred to as a television) 2, such as a home television receiver, having incorporated therein a loudspeaker. The game machine 3 includes a controller 6 connected to the game machine 3 via a connection code and an optical disc 4, which is one example of a selectively-used storage medium which can be exchangeably removed from the game machine 3. Also, as required, the game machine 3 has removably inserted therein a memory card 5 including, for example, a backup memory for fixedly storing save data, etc. The game machine 3 executes a game program stored in the optical disc 4 to cause the execution results to be displayed on the television 2 as a game image. Furthermore, the game machine 3 can use save data stored in the memory card 5 to reproduce a previous game state to cause a game image in that state to be displayed on the television 2. The player of the game machine 3 operates the controller 6 while viewing the game image displayed on the television 2, thereby enjoying the progress of the game. In the present exemplary illustrative embodiment, the game program and other data are stored in the optical disc 4. Alternatively, the game program and other data can be supplied through another medium or a communication line.

As described above, the controller 6 is connected to the game machine 3 via the connection code, which is removable from the game machine 3. The controller 6 is a controller for mainly operating a player object (typically, a game main character to be controlled by the player) appearing in a game space displayed on the television 2, and includes input units, such as a plurality of operation buttons, keys, a stick, etc. Specifically, the controller 6 has formed thereon grip portions held by the player. Furthermore, the controller 6 includes a main stick 61 and a cross key 67, which are operable typically by the left thumb of the player, and a C stick 68, an A button 62, a B button 63, an X button 64, a Y button 65, and a start-pause button 69, which are operable typically by the right thumb of the player. The controller 6 further includes an R button 66a and an L button 66b, which are operable typically by the left or right forefinger of the player. An operation using these input units of the controller 6 is performed in the course of the game. However, such an operation is not directly related to an exemplary illustrative embodiment and therefore is not described herein.

Figure 2:
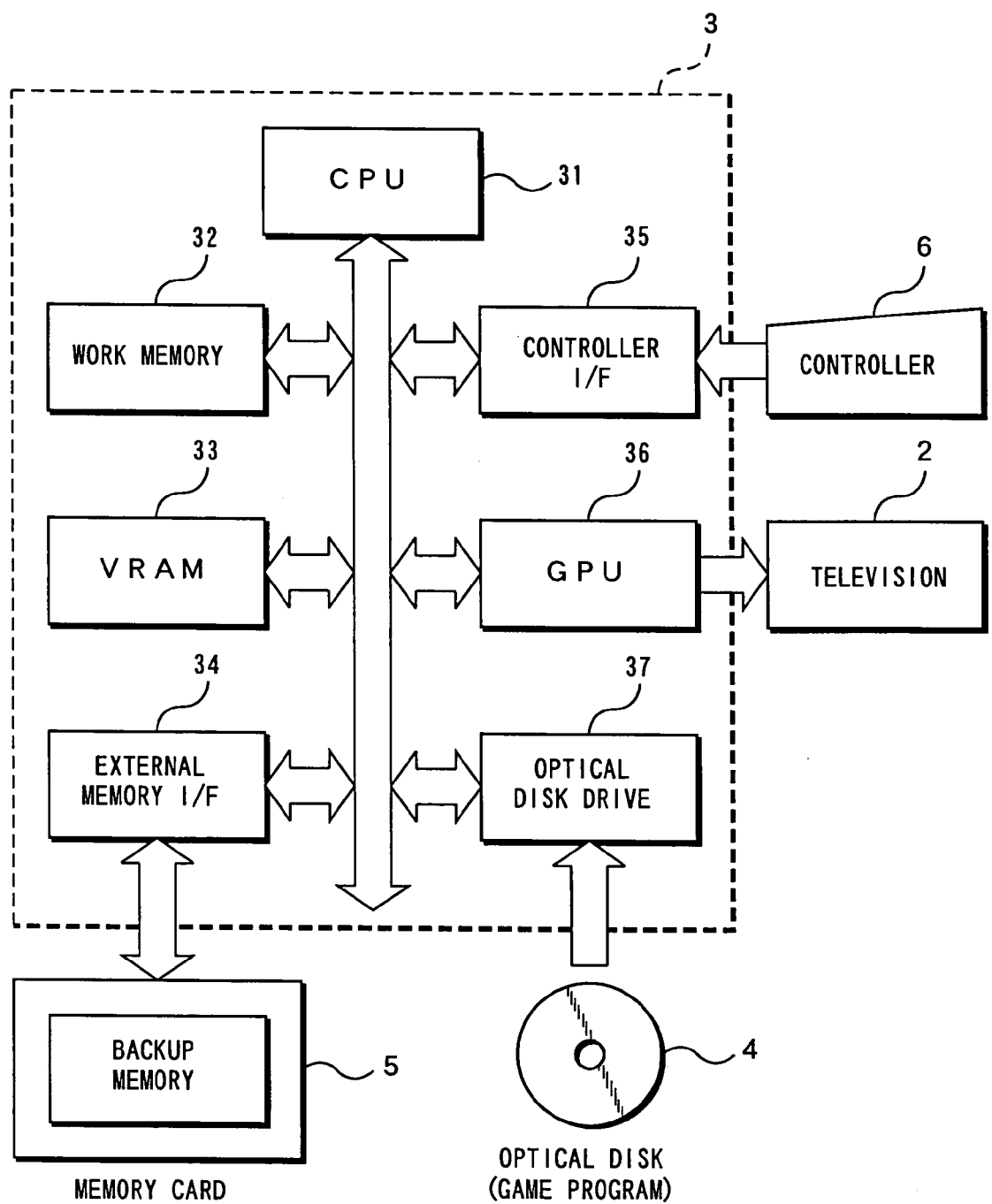
FIG. 2 is a functional block diagram of a game machine 3 of FIG. 1.

With reference to FIG. 2, the structure of the game machine 3 is described below. FIG. 2 is a functional block diagram of the game machine 3.

In FIG. 2, the game machine 3 includes a Central Processing Unit (CPU) 31 of, for example, 128 bits, for executing various programs. The CPU 31 executes a boot program stored in a boot ROM not shown to boot a memory, such as a work memory 32, and then executes the game program stored in the optical disc 4 for performing game processing in accordance with that game program. The CPU 31 has connected via a predetermined bus thereto the work memory 32, a video RAM (VRAM) 33, an external memory interface (I/F) 34, a controller (I/F) 35, a Graphics Processing Unit (GPU) 36, and an optical disc drive 37.

The work memory 32 is a storage area used by the CPU 31 and stores, as appropriate, a game program required for processes performed by the CPU 31. For example, the work memory 32 stores the game program and various data read from the optical disc 4. Also, the work memory 32 stores temporary data generated by the CPU 31 while executing the game program. By using the game program and various data stored in the work memory 32, the CPU 31 causes the game to proceed. The VRAM 33 stores game image data to be displayed on the television 2. The external memory I/F 34 communicably connects the game machine 3 and the memory card 5 by fitting the memory card 5 in a connector not shown. The CPU 31 accesses the backup memory provided in the memory card 5 via the external memory I/F 34. The controller I/F 35 communicably connects an external device fitted in a plurality of connectors not shown and the game machine 3 together. For example, the controller 6 is fitted in the above connectors via connection codes and is connected to the game machine via the controller I/F 35. The GPU 36 is structured, for example, by a semiconductor chip for performing a calculation process required for displaying 3D graphics, and processes game image data processed by the CPU 31 and game image data stored in the VRAM 33 for game image display on the television 2. The optical disc drive 37 reads the data stored in the optical disc 4 placed at a predetermined reading position for output to the bus of the game machine 3.

Figure 3:
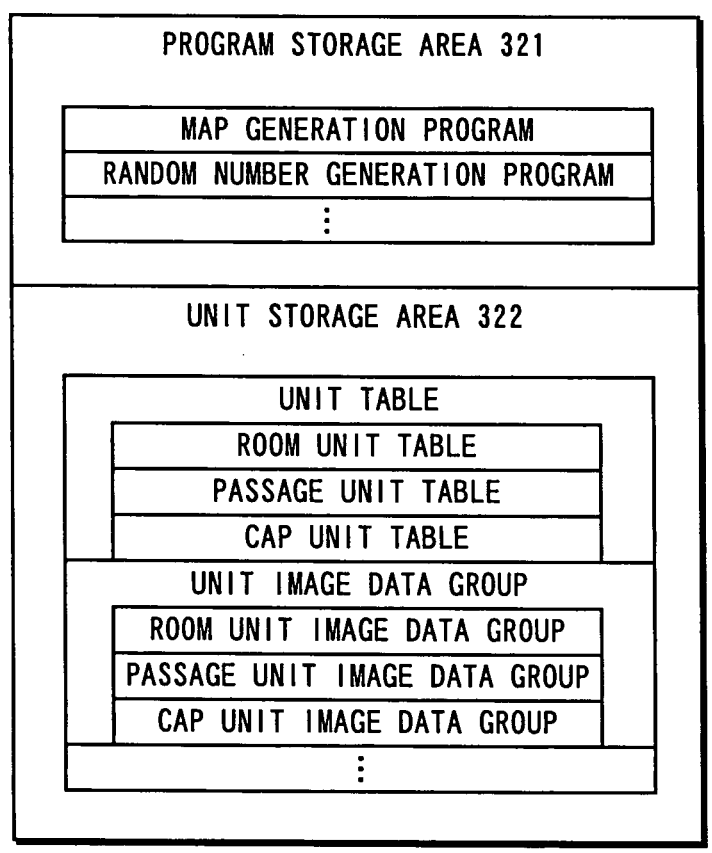
FIG. 3 is a schematic illustration of a memory map for describing one example of programs and data stored in a work memory 32 of FIG. 2.

As described above, the work memory 32 stores, as appropriate, the game program required for the processes performed by the CPU 31, such as the game program and other various data read by the CPU 31 from the optical disc 4. With reference to FIG. 3, examples of programs and data stored in the work memory 32 when the game program of the exemplary illustrative embodiment is executed. FIG. 3 is a schematic illustration of a memory map for describing one example of the programs and data stored in the work memory 32.

In FIG. 3, the work memory 32 has a program storage area 321 and a unit storage area 322. Specifically, the program storage area 321 has stored therein a map generation program to be executed by the CPU 31, a random number generation program used by the map generation program, etc. The unit storage area 322 has stored therein a unit table and a unit image data group to be used by the map generation program, etc. The unit table includes a room unit table, a passage unit table, and a cap unit table. The unit image data group includes a room unit image group, a passage unit image group, and a cap unit image.

The map generation program has defined therein a process of generating a map to be used by the game and to be generated according to a flowchart which will be described further below. In this process, a random number is used for selecting a unit, which will be also described further below. The random number is generated by the random number generation program.

With reference to FIGS. 4A-4D and 5, the room unit image group and the room unit table are described below. FIGS. 4A-4D are non-limiting examples of a room unit included in the room unit image group stored in the unit storage area 322, and FIG. 5 is an illustration showing a non-limiting example of the room unit table.

Figure 4A:
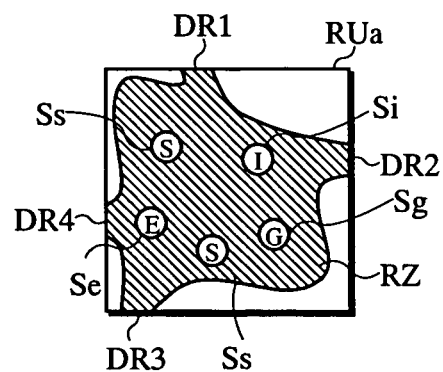
FIG. 4A is an illustration showing one non-limiting example of a room unit RUa included in a room unit image group stored in a unit storage area 322 of FIG. 3.
Figure 4B:
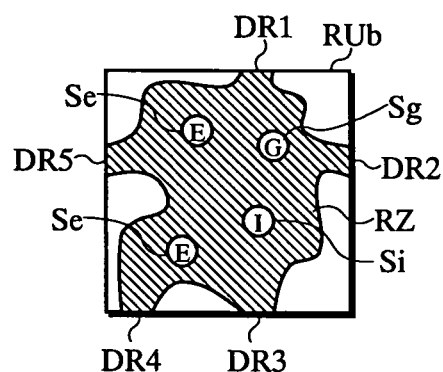
FIG. 4B is an illustration showing one non-limiting example of a room unit RUb included in the room unit image group stored in the unit storage area 322 of FIG. 3.
Figure 4C:
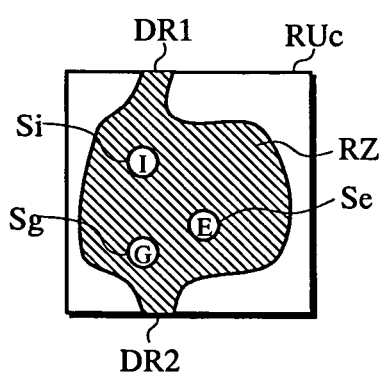
FIG. 4C is an illustration showing one non-limiting example of a room unit RUc included in the room unit image group stored in the unit storage area 322 of FIG. 3.
Figure 4D:
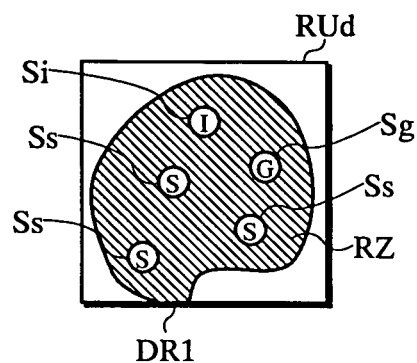
FIG. 4D is an illustration showing one non-limiting example of a room unit RUd included in the room unit image group stored in the unit storage area 322 of FIG. 3.

In FIGS. 4A-4C, the unit storage area 322 has stored therein a plurality of room units RU forming the room unit image group. The room unit RU is a unit zone forming a map together with passage units PU and a cap unit CU, which will be described further below. For example, the room unit RU is formed as a rectangular area, and includes a room zone RZ in which an object, such as the player object, can move or can be disposed. In FIGS. 4A-4C, the room zone is represented as a hatched area. The room zone RZ is formed so as to be at least partially in contact with the boundary of the rectangular area of the room unit RU to form a line segment having a predetermined length. The line segment in contact with the boundary is set with the door DR. The door DR is merely an example of a connecting portion for connection with another unit.

For example, in a room unit RUa illustrated in FIG. 4A having four sides indicating boundaries of the rectangular area, its room zone RZ is in contact with each of the four sides at one point, where a door is set. That is, doors DR1 through DR4 are set on the sides of the room unit RUa. In a room unit RUb illustrated in FIG. 4B, its room zone RZ is in contact with each side of the room unit RUb at one or more points, where a door is set. That is, doors DR1 through DR5 are set at five points on the sides of the room unit RUb, where the doors DR3 and DR4 of the room unit RUb are set on the same side. In a room unit RUc illustrated in FIG. 4C, its room zone RZ is in contact with each of two sides of the room unit RUc that are opposite to each other at one point, where a door is provided. That is, doors DR1 and DR2 are set on these two sides. In a room unit RUd illustrated in FIG. 4D, its room zone RZ is in contact with one side of the room unit RUd at one point, where a door DR1 is set.

As such, the room unit RU has formed therein a room zone RZ having an arbitrary shape according to the type of the unit. At least one door DR having the predetermined length is set to at least one of those four sides of the room unit RU. Here, as illustrated in the examples of the room unit RU, some of the four sides of the room unit RU are not set with a door DR, and some are set with a plurality of doors DR.

Also, the room unit RU has set inside the room zone RZ a point at which an additional component, such as a start point and a goal point of the map, an enemy character, and an item, that may possibly be disposed. Such a point is hereinafter referred to as a slot for description. Specifically, a point at which a start point may possibly be disposed is referred to as a start slot Ss, a point at which a goal point may possibly be disposed is referred to as a goal slot Sg, a point at which an enemy character may possibly be disposed is referred to as an enemy slot Se, and a point at which an item may possibly be disposed is referred to as an item slot Si. Here, at lest one goal slot Sg is always set inside the room zone RZ formed in the room unit RU. For example, inside the room zone RZ formed in the room unit RUa illustrated in FIG. 4A, two start slots Ss, one goal slot Sg, one enemy slot Se, and one item slot Si are set. Inside the room zone RZ formed in the room unit RUb illustrated in FIG. 4B, two enemy slots Se, one goal slot Se, and one item slot Si are set. Inside the room zone RZ formed in the room unit RUc illustrated in FIG. 4C, one goal slot Sg, one enemy slot Se, and one item slot Si are set. Inside the room zone RZ formed in the room unit RUd illustrated in FIG. 4D, three start slots Ss, one goal slot Sg, and one enemy slot Si are set.

In FIG. 5, the room unit table stored in the unit storage area 322 has stored therein data for each room unit RU included in the above-described room unit image group. For example, the room unit table has stored therein, for each room unit RU, its size, a setting position of the door(s) DR, the number of slots, etc. The size of the room unit RU is equivalent to the size of the above-described rectangular area, and is represented by a multiple of the size of a reference unit of 1×1. For example, the above-described room units RUa through RUd each have the size of 4×4. Note that the size of any of the room units RU is hereinafter represented with reference to a value of 1×1, which represents the size of the reference unit.

The setting position of each door DR set to the room unit RU is represented by using characters a through d respectively denoting the four sides of the room unit RU (for example, the upper side of the room unit RU is denoted as a side a, the right side thereof as a side b, the lower side thereof as a side c, and the left side thereof as a side d), each character being provided with a numerical value indicative of a position on the corresponding one of the sides a through d where a door DR is set. The numerical value indicative of the position represents a distance from one end of the side where the door DR is set. For example, when the upper side of the room unit RUa illustrated in FIG. 4A is denoted as a side a and the door DR1 is set at the second reference unit from the left end on the side a of the room unit RUa, the setting position of the door DR1 is denoted as "a2", which is stored in the room unit table. The number of slots set in the room unit RU includes the number of start slots Ss, the number of goal slots Sg, the number of enemy slots Se, and the number of item slots Si. The CPU 31 refers to this room unit table to obtain data of each room unit RU required for map generation, which will be described further below, without the need for performing image analysis on the room unit image group every time map generation is performed.

Figure 6A:
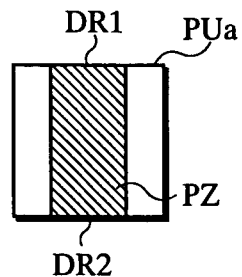
FIG. 6A is an illustration showing one non-limiting example of a passage unit PUa included in a passage unit image group stored in the unit storage area 322 of FIG. 3.
Figure 6B:
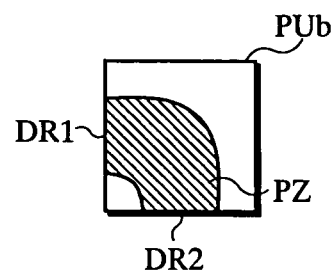
FIG. 6B is an illustration showing one non-limiting example of a passage unit PUb included in the passage unit image group stored in the unit storage area 322 of FIG. 3.
Figure 6C:
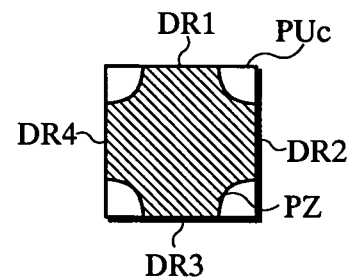
FIG. 6C is an illustration showing one non-limiting example of a passage unit PUc included in the passage unit image group stored in the unit storage area 322 of FIG. 3.
Figure 6D:
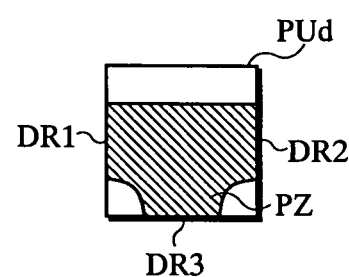
FIG. 6D is an illustration showing one non-limiting example of a passage unit PUd included in the passage unit image group stored in the unit storage area 322 of FIG. 3.
Figure 6E:
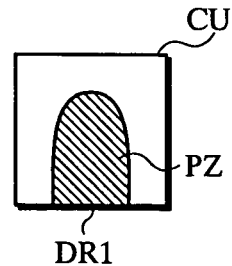
FIG. 6E is an illustration showing one non-limiting example of a cap unit CU stored in the unit storage area 322 of FIG. 3.

With reference to FIGS. 6A-6E, 7, and 8, the passage unit image group, the cap unit image, the passage unit table, and the cap unit table are described below. FIGS. 6A-6D are illustrations showing examples of a passage unit included in the passage unit image group stored in the unit storage area 322, and FIG. 6E is an illustration showing one example of a cap unit CU included in the cap unit image stored in the unit storage area 322. FIG. 7 is an illustration showing one example of the passage unit table. FIG. 8 is an illustration showing one example of the cap unit table.

In FIGS. 6A-6D, the unit storage area 322 has stored therein a plurality of passage units PU as the passage unit image group. For example, the passage unit PU is formed as a rectangular area, and includes a passage unit zone PZ having an arbitrary shape in which the player object can move. In FIG. 6E, the unit storage area 322 has stored therein at least one cap unit CU as a cap unit image. For example, the cap unit CU is formed as a rectangular area, and includes a passage zone PZ having an arbitrary shape in which the player object can move. In FIGS. 6A-6E, each passage zone PZ is represented as a hatched area. The passage zone PZ is formed so as to be at least partially in contact with the boundary of the rectangular area of the passage unit PU or the cap unit CU to form a line segment having a predetermined length. The line segment in contact with the boundary is set with a door DR. Note that the length of the line segment in the passage unit PU or the cap unit CU is equal to the above-described length of the line segment in the room unit RU.

For example, in a passage unit PUa illustrated in FIG. 6A having four sides indicating boundaries of the rectangular area, its passage zone PZ is in contact with two of the four sides that are opposite to each other at one point, where a door is set. That is, doors DR1 and DR2 are set on the two sides of the passage unit PUa. In a passage unit PUb illustrated in FIG. 6B, its passage zone PZ is in contact with two of the four sides that are adjacent to each other at one point, where a door is set. That is, doors DR1 and DR2 are set on the two sides of the passage unit PUb. In a passage unit PUc illustrated in FIG. 6C, its passage zone PZ is in contact with the four sides at one point, where a door is set. That is, doors DR1 through DR4 are set on the four sides of the passage unit PUc. In a passage unit PUd illustrated in FIG. 6D, its passage zone PZ is in contact with three of the four sides at one point, where a door is set. That is, doors DR1 through DR3 are set on the three sides of the passage unit PUd. In the cap unit CU illustrated in FIG. 6E having four sides indicating boundaries of the rectangular area, its passage zone PZ is in contact with one of the four sides at one point, where a door DR1 is set.

As such, the passage unit PU and the cap unit CU each have formed therein the passage zone PZ having an arbitrary shape according to the type of the unit. In the passage unit PU, at least two doors DR each having the predetermined length are set to at least two of those four sides. By contrast, in the cap unit CU, one door DR having the predetermined length is set to only one of those four sides. That is, the passage unit PU is different from the cap unit CU in the number of doors that can be set: the cap unit CU can be defined as a passage unit where only one door DR can be set. However, in the following description, the cap unit CU is differentiated from the passage unit PU for clear distinction between the two. Also, the room unit RU, the passage unit PU, and the cap unit CU are collectively referred to as units.

In FIG. 7, the passage unit table stored in the unit storage area 322 has stored therein data for each passage unit PU included in the above-described passage unit image group. For example, the passage unit table has stored therein, for each passage unit PU, its size, a setting position of each door DR, etc. The size of the passage unit PU is equivalent to the size of the above-described rectangular area. For example, the above-described passage units PUa through PUd each have the size of a reference unit of 1×1. The setting position of each door DR set to the passage unit PU is represented by using characters a through d respectively denoting the four sides of the passage unit PU, each character being provided with a numerical value indicative of a point on the corresponding one of the sides a through d where the door DR is set. The numerical value indicative of the point represents a distance from one end of the side where the door DR is set. For example, when the upper side of the passage unit PUa illustrated in FIG. 6A is denoted as a side a and the door DR1 is set at the first reference unit from the left end on the side a of the passage unit PUa, the setting position of the door DR1 is denoted as "a1", which is stored in the passage unit table. The CPU 31 refers to this passage unit table to obtain data of each passage unit PU required for map generation, which will be described further below, without the need for performing image analysis on the passage unit image group every time map generation is performed.

In FIG. 8, the cap unit table stored in the unit storage area 322 has stored therein data for the cap unit CU included in the above-described cap unit image. For example, the cap unit table has stored therein, for the cap unit CU, its size, a setting position of the door DR, etc. The size of the cap unit CU is equivalent to the size of the above-described rectangular area. For example, the above-described cap unit CU has the size of a reference unit of 1×1. The setting position of the door DR set to the cap unit CU is represented by using characters a through d respectively denoting the four sides of the cap unit CU, each character being provided with a numerical value indicative of a point on the corresponding one of the sides a through d where the door DR is set. The numerical value indicative of the point represents a distance from one end of the side where the door DR is set. For example, when the lower side of the cap unit CU illustrated in FIG. 6E is denoted as a side c and the door DR1 is set at the first reference unit from the right end on the side c of the cap unit CU, the setting position of the door DR1 is denoted as "c1", which is stored in the cap unit table. The CPU 31 refers to this cap unit table to obtain data of the cap unit CU required for map generation, which will be described further below, without the need for performing image analysis on the cap unit image every time map generation is performed. Note that, as described above, the cap unit CU can be defined as a passage unit where only one door DR is set. Therefore, the data of the cap unit CU can be included in the above-described passage unit table.

Figure 9:
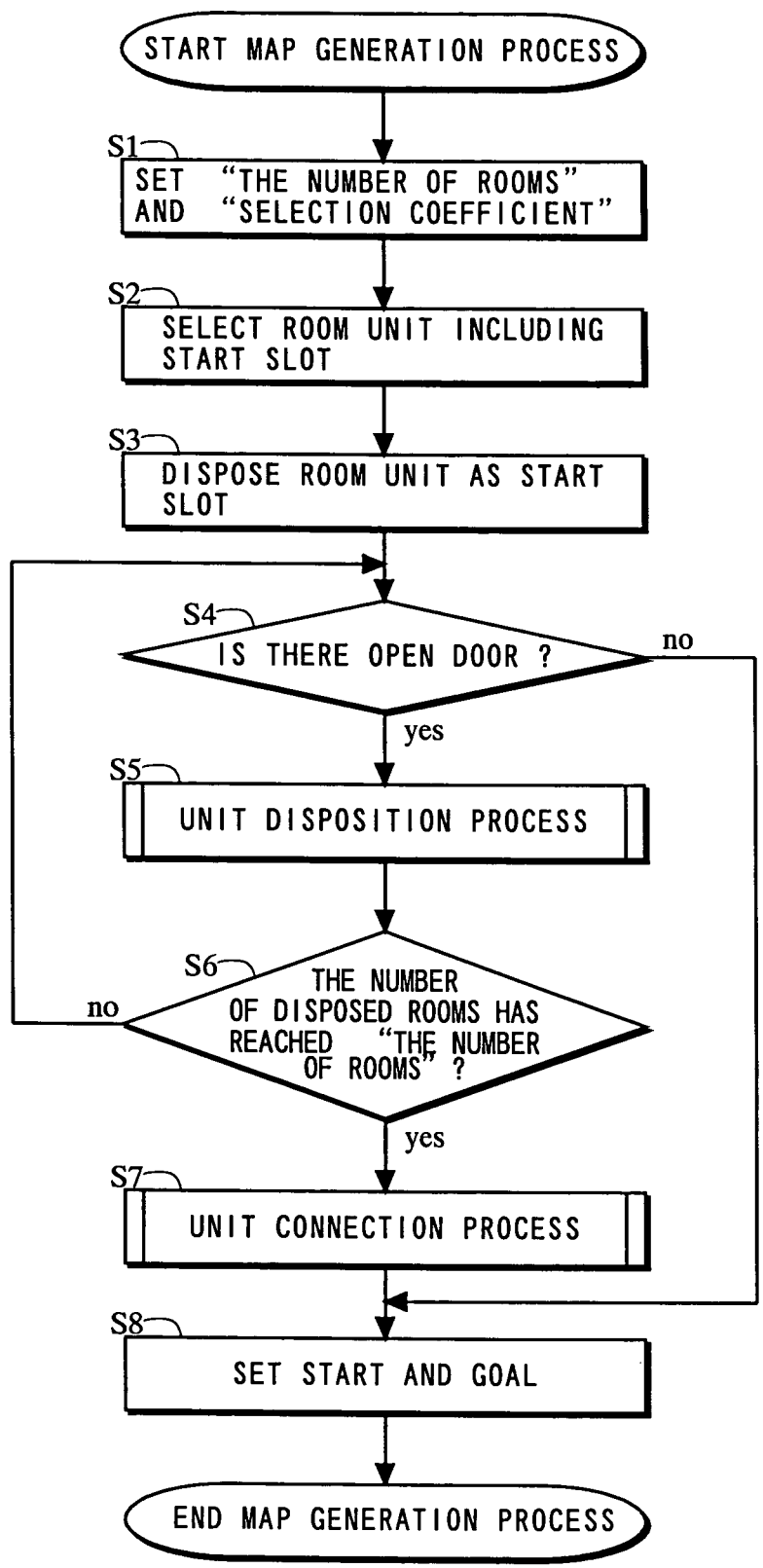
FIG. 9 is a flowchart showing the entire map generation process performed by a game machine 3 of FIG. 1.
Figure 10:
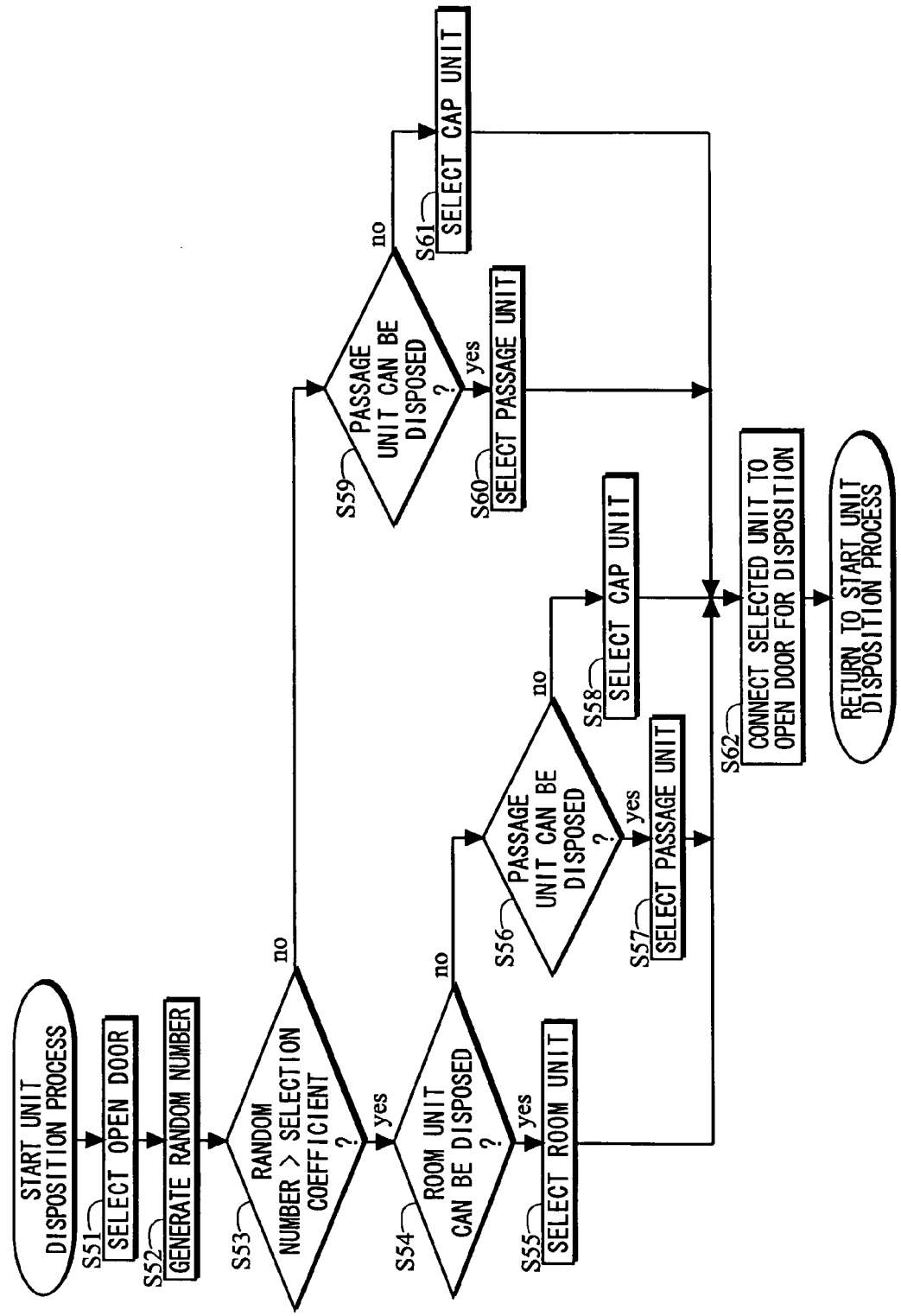
FIG. 10 is a subroutine showing the detailed operation of step S5 of FIG. 9.
Figure 11:
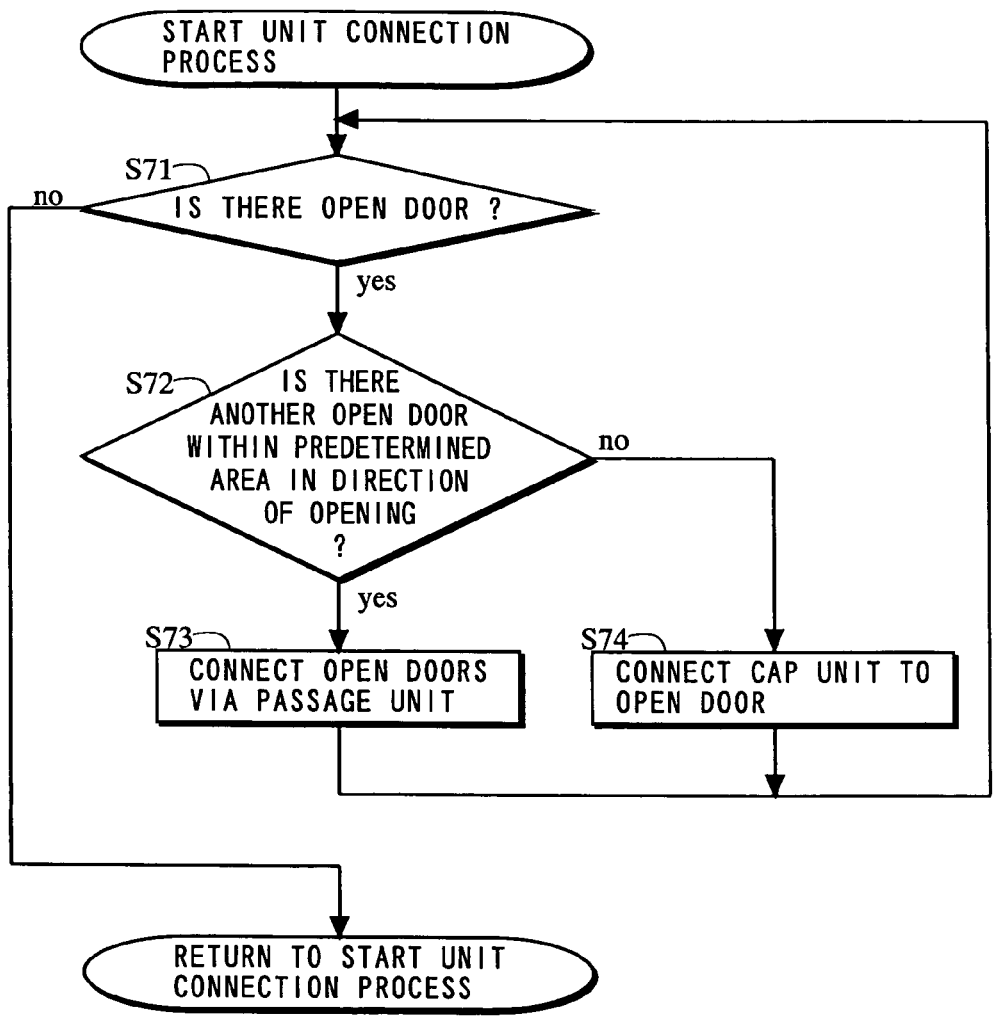
FIG. 11 is another subroutine showing the detailed operation of step S5 of FIG. 9.

With reference to FIGS. 9 through 11, a map generation process performed by the game machine 3 in the game system 1 is described below. FIG. 9 is a flowchart showing the entire map generation process performed by the game machine 3. FIG. 10 is a subroutine showing the detailed operation of a unit disposition process of FIG. 9. FIG. 11 is a subroutine showing the detailed operation of a unit connection process of FIG. 9.

When the game machine 3 is powered on, the CPU 31 of the game machine 3 executes the boot program stored in the boot ROM not shown to initialize each unit in the work memory 32, etc. The programs, such as the map generation program, and various data stored in the optical disc 4 are then read to the work memory 32, thereby starting execution of the map generation program.

In FIG. 9, the CPU 31 sets the number of rooms RN and a selection coefficient SF (step S1), and then goes to the next step. The number of rooms RN is the number of room units RU that can be disposed on a map to be generated in accordance with the map generation program. The selection coefficient SF is a coefficient for controlling the type of units to be connected to each other, and is set to a numerical value in a range of 0 to 1 in the exemplary illustrative embodiment, which will be described in further detail below. The number of rooms RN and the selection coefficient SF may be automatically set by the CPU 31 in accordance with a program, or may be manually set by the player operating the controller 6.

Next, the CPU 31 refers to the room unit table stored in the unit storage area 322 to select a room unit RU including a start slot Ss (step S2). The CPU 31 then extracts from the room unit image group stored in the unit storage area 322 an image corresponding to the room unit RU selected in the above step S2, disposes the room unit on a predetermined virtual plane (which is an area on the work memory 32 of FIG. 2 and is hereinafter referred to as a map area) for generating a game map (step S3), and then goes to the next step. Here, the CPU 31 can dispose the room unit RU rotated by 90 degrees on the map area. That is, when a rotation angle of the room unit RU illustrated in any of FIGS. 4A-4D is taken as 0 degrees, the CPU 31 can cause each room unit RU to be rotated by 90 degrees, 180 degrees, or 270 degrees clockwise for disposition on the map area. With this, it is possible to increase the diversity of room units while suppressing the amount of data. Note that the CPU 31 randomly selects an angle as the rotation angle of the room unit RU used in the above step S3 from 0 degrees, 90 degrees, 180 degrees, and 270 degrees.

Next, the CPU 31 determines whether there is an open door among the doors DR set in the unit already disposed on the map area (step S4). Here, the open door is a door DR that has been set in the above-described room unit RU or the passage unit PU and has not yet been connected to any door DR of another unit. If there is an open door, the CPU 31 goes to step S5. If there is no open door, the CPU 31 goes to step S8.

In step S5, the CPU 31 performs a process of disposing a new unit on the map area, and then goes to step S6. With reference to the subroutine showing the detailed operation of this unit disposition process in FIG. 10, the detailed operation performed in this step S5 is described below.

In FIG. 10, the CPU 31 randomly selects one open door of the unit already disposed on the map area (step S51), and then goes to the next step. In some cases, a passage unit PU has been set on the map area in a unit disposition process, which will be described further below. Also, in some cases, in step S51, a door DR of not only the room unit RU but also the passage unit PU may be selected as an open door.

Next, the CPU 31 executes the random number generation program to generate a random number within a predetermined range (for example, 0 to 1) (step S52), and then goes to the next step.

Next, the CPU 31 determines whether the random number generated in the above step S52 is larger than the selection coefficient SF selected in step S1 (step S53). If the open door selected in step S51 is a door DR set in a room unit RU, the CPU 31 multiplies the selection coefficient SF by a predetermined multiplication factor M of 1 or larger (1.5, for example), and compares the random number with the multiplication result in step S53. If the random number is larger than the selection coefficient SF, the CPU 31 goes to step S54. If the random number is not larger than the selection coefficient SF, the CPU 31 goes to step S59.

In step S54, the CPU 31 determines whether the room unit image group includes a room unit RU which can be disposed so as to be connected to the open door selected in step S51. In the following description, the open door selected in step S51 is referred to as a "selected door". Here, a determination to be made by the CPU 31 in step S54 is described in detail below. The room unit RU to be newly disposed is disposed so that the door DR set in that room unit RU and the selected door DR are connected to each other. FIG. 12 illustrates one example in which the door DR3 of the room unit RUa already disposed on the map area is selected in step S51 and the selected door DR3 is connected to the door DR1 of the room unit RUc which is to be newly disposed. A determination that the room unit RU cannot be disposed is made in any of the following three cases. That is, if a room unit RU is disposed so that any door(s) DR of the room unit RU and the selected door are connected to each other: (1) the room unit RU and another unit already disposed on the map area will overlap each other; (2) an open door other than the door DR connected to the selected door of the room unit RU will be in contact with another unit already disposed on the map area, and therefore will become unconnectable; or, (3) disposition of the room unit RU will cause an open door of the unit already disposed to be unconnectable. A determination of whether the room unit RU can be disposed is made also for each of the room units RU obtained after rotation by 90 degrees, 180 degrees, and 270 degrees. Therefore, a determination of whether the room unit RU can be appropriately disposed with its door DR being connected to the selected door is made for all the doors DR set to the room unit RU. The CPU 31 makes such a determination by referring to the data including the size of each room unit RU and the setting position of each door DR stored in the room unit table. If the room unit image group includes even one room unit RU that can be disposed, the CPU 31 goes to step S55. If the room unit image group includes no such room unit RU, the CPU 31 goes to step S56.

In step S55, the CPU 31 randomly selects one room unit RU from the room units RU that are determined in step S54 as being able to be disposed. The CPU 31 then goes to step S62.

Figure 13:
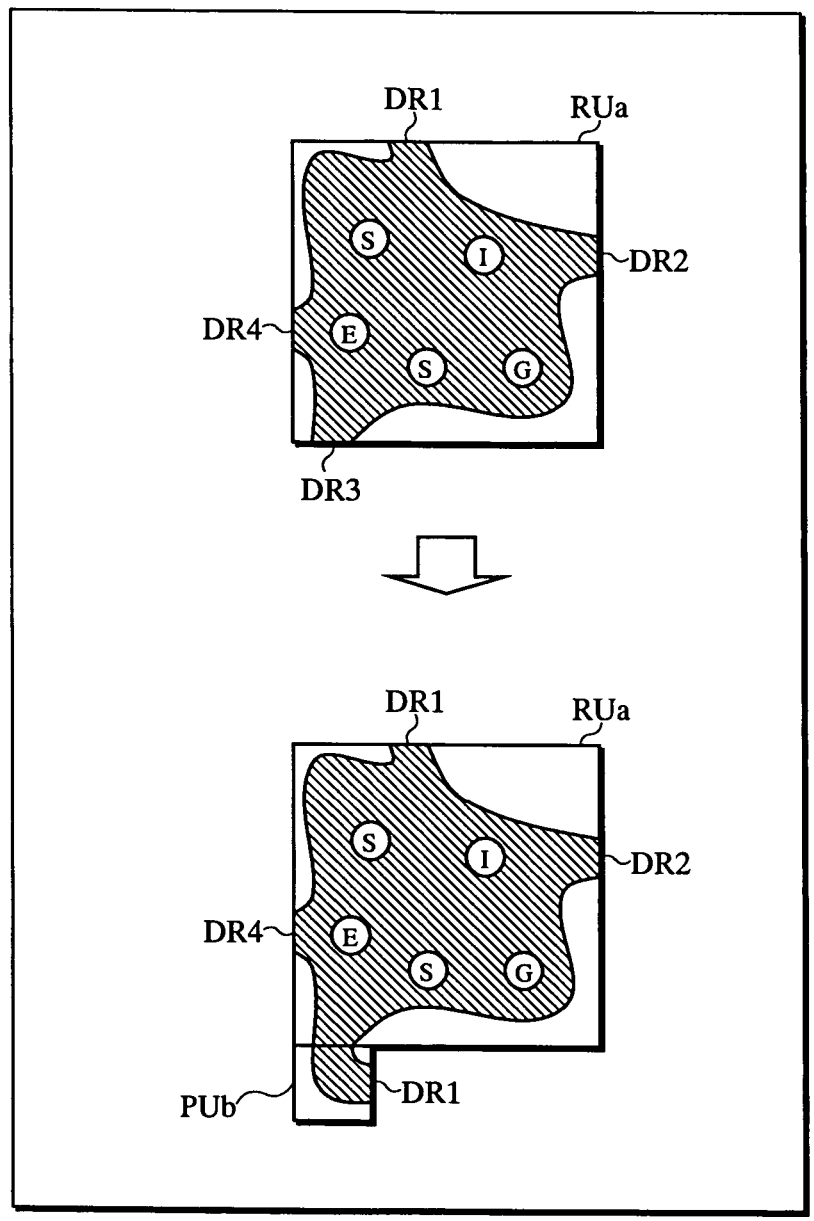
FIG. 13 is an illustration showing one non-limiting example in which a door DR3 of the passage unit PUa disposed on the map area and is selected as a selected door, and the selected door is connected to a door DR2 of the passage unit PUb for disposition.

On the other hand, in step S56, the CPU 31 determines whether the passage unit image group includes a passage unit PU that can be disposed so as to be connected to the selected door. Here, determination to be made by the CPU 31 in step S56 is described in detail below. The passage unit PU to be newly disposed is disposed so that the door DR set in that passage unit PU and the selected door DR are connected to each other. FIG. 13 illustrates one example in which the door DR3 of the room unit RUa already disposed on the map area is selected in step S51 and the selected door DR3 is connected to the door DR2 of the passage unit PUb which is to be newly disposed. A determination that the passage unit PU cannot be disposed is made in a manner similar to that described in step S54 in the case of the room unit RU. If the passage unit image group includes even one passage unit PU that can be disposed, the CPU 31 goes to step S57. If the passage unit image group includes no such passage unit PU, the CPU 31 goes to step S58.

In step S57, the CPU 31 randomly selects one passage unit PU from the passage units PU that are determined in step S56 as being able to be disposed, and then goes to step S62. On the other hand, in step S58, the CPU 31 selects a cap unit CU, and then goes to step S62.

As described above, in step S53, if the random value is not larger than the selection coefficient SF, the CPU 31 goes to step S59. In step S59, the CPU 31 determines whether the passage unit image group includes a passage unit PU that can be disposed to the selected door. If the passage unit image group includes even one passage unit PU that can be disposed, the CPU 31 goes to step S60. If the passage unit image group includes no such passage unit PU, the CPU 31 goes to step S61. The operation of this step S59 is similar to that of the above-described step S56, and therefore is not described in detail herein.

In step S60, the CPU 31 randomly selects one passage unit PU from the passage units PU determined in step S59 as being capable of being disposed. The CPU 31 then goes to step S62.

On the other hand, in step S61, the CPU 31 selects the cap unit CU, and then goes to step S62.

In step S62, the CPU 31 then causes the unit selected in any of steps S55, S57, S58, S60, and S61 so that the door DR of that unit and the selected unit are connected to each other. Here, if the unit selected in any of the above steps includes a plurality of doors DR connectable to the selected door, the CPU 31 randomly selects one of the plurality of such doors DR. The CPU 31 then ends the subroutine of the unit disposition process to go to step S6 of FIG. 9.

Figure 14:
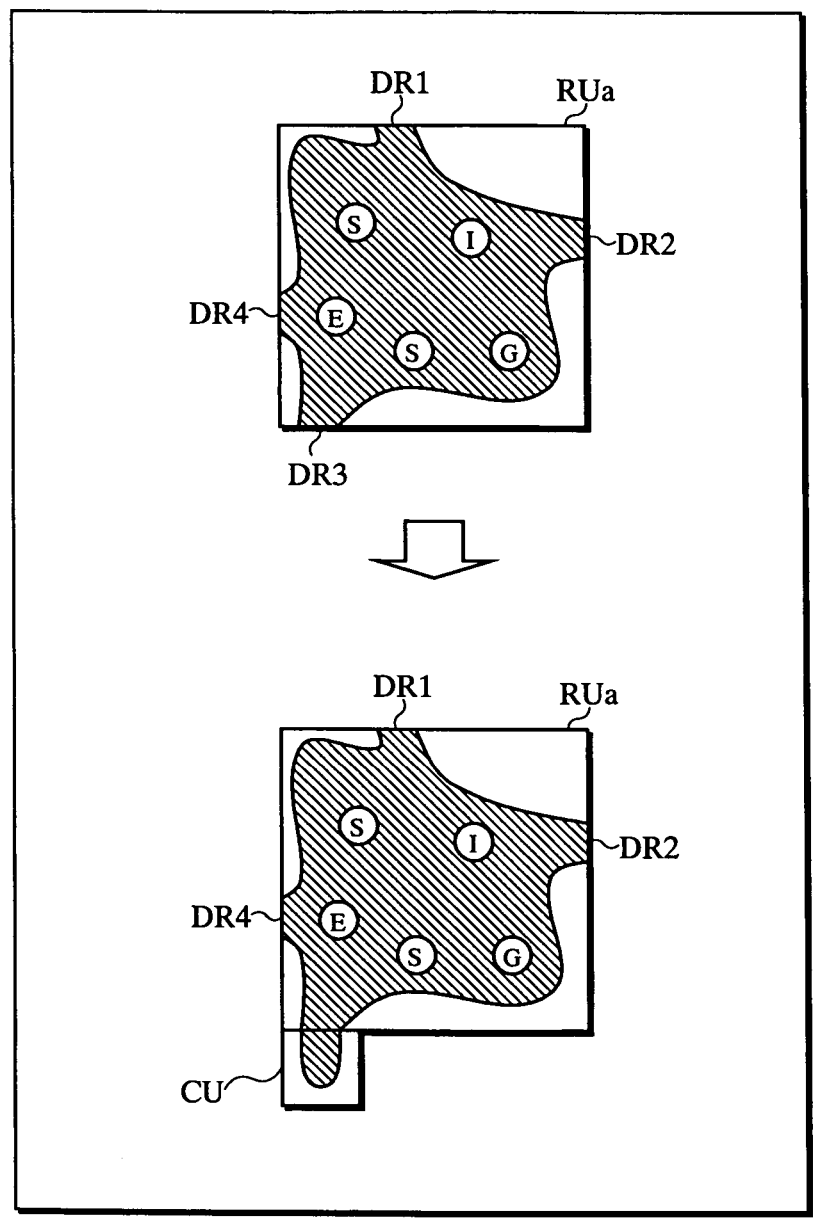
FIG. 14 is an illustration showing one non-limiting example in which the door DR3 of the passage unit PUa disposed on the map area is selected as a selected door, and the selected door is connected to a door DR1 of the cap unit CU for disposition.

For example, as illustrated in FIG. 12, when the door DR3 of the room unit RUa is set as a selected door and the room unit RUa is disposed so that the selected door is connected to the door DR1 of the room unit RUc, the room unit RUa and the room unit RUc are disposed so that their sides that are opposite to each other are at least partially in contact with each other. In another example, as illustrated in FIG. 13, when the door DR3 of the room unit RUa is set as a selected door and the room unit RUa is disposed so that the selected door is connected to the door DR1 of the passage unit PUb, the room unit RUa and the passage unit PUb are disposed so that their sides that are opposite to each other are at least partially in contact with each other. In still another example, as illustrated in FIG. 14, when the door DR3 of the room unit RUa is set as a selected door and the room unit RUa is disposed so that the selected door is connected to the door DR1 of the cap unit CU, the room unit RUa and the cap unit CU are disposed so that their sides that are opposite to each other are at least partially in contact with each other. As illustrated in FIGS. 12 through 14, when units are connected to each other via their doors DR, the room zones RZ or the passage zones PZ formed in these units are connected to each other via their doors DR. Since these doors DR have an equal length (that is, the predetermined length of the line segment), the zones are connected without a dimensional difference. Also, as illustrated in FIG. 14, when the cap unit CU is connected via the door DR to the unit disposed on the map area, the room zone RZ or the passage zone PZ formed in the unit disposed on the map area forms a closed area (dead end) via its door DR.

Here, consider steps S53 through S61 illustrated in FIG. 10. The CPU 31 determines in step S53 whether the random number is larger than the selection coefficient SF. If the random number is larger than the selection coefficient SF, the CPU 31 determines in step S54 whether there is a room unit RU that can be disposed. If the random number is not larger than the selection coefficient SF, the CPU 31 determines in step S59 whether there is a passage unit PU that can be disposed. That is, if the random number is larger than the selection coefficient SF, the CPU 31 gives a higher priority to the room unit RU for disposition on the map area. If the random number is not larger than the selection coefficient SF, the CPU 31 does not cause the room unit RU to be disposed on the map area. As such, depending on the value of the selection coefficient SF, a ratio of the room units RU to be disposed on the map area can be controlled. Specifically, if the selection coefficient SF is set to be smaller than a median value of a range of possible random numbers, the ratio of the room units RU to be disposed on the map area is large. If the selection coefficient SF is set to be larger than the median value of that range, the ratio of the room units RU to be disposed on the map area is small.

On the other hand, if the open door selected in step S51 is a door DR set in a room unit RU, the CPU 51 multiplies the selection coefficient SF by the predetermined multiplication factor M of 1 or larger, and then compares the random number with the multiplication result in step S53. Therefore, as the multiplication factor M is larger, the selection coefficient SF with which the random number is compared is larger, thereby increasing the possibility that the CPU 31 goes to the step S59. That is, as the multiplication factor M is larger, the passage unit PU is given a higher priority for disposition on the map area. Therefore, with the value of the multiplication factor M, the type of the unit that is connected to the room unit RU already disposed on the map area can be controlled. Specifically, by setting the multiplication factor M to be small, the possibility that the room units RU are connected together on the map area can be increased. On the other hand, by setting the multiplication factor M to be large, the possibility that a passage unit PU is connected to the room unit RU on the map area can be increased.

As such, with the selection coefficient SF, the ratio of the units of two types disposed on the map area can be controlled. Also, with the multiplication factor M, the possibility of disposition in which a unit of one type is connected to a unit of the other type can be controlled. That is, by adjusting the selection coefficient SF and the multiplication factor M, it is possible to generate a map in consideration of the ratio of the units of two types disposed on the map area and the affinity for connection between the units of two types.

In the above description, the selection coefficient SF is set so as to be commonly used for all units. Alternatively, different selection coefficients SF can be set for the units or the doors DR provided thereto. With this, it is possible to generate a map in consideration of the affinity among the units.

Referring back to FIG. 9, in step S6, the CPU 31 determines whether the number of room units RU disposed on the map area has reached the number of rooms RN set in step S1. If the number of room units RU has not reached the number of rooms RN, the CPU 31 returns to step S4 for further processing. If the number of room units RU has reached the number of rooms RN, the CPU 31 goes to step S7.

In step S7, the CPU 31 performs a process of connecting the open doors of the units disposed on the map area, and then goes to step S8. With reference to a subroutine showing the detailed operation of this unit connection process, the operation in this step S7 is described in detail below.

In FIG. 11, the CPU 31 determines whether there is an open door among the doors DR set in the unit already disposed on the map area (step S71). The operation in this step S71 is similar to that in step S4, and therefore is not described herein. If there is an open door, the CPU 31 goes to step S72. If there is no open door, the CPU 31 ends the subroutine of the unit connection process.

In step S72, the CPU 31 selects one open door, and then determines whether there is another open door within a predetermined area in a direction of the opening of the open door (that is, in a direction opposite to the unit including the open door). If there is such another open door within the predetermined area, the CPU 31 goes to step S73. If there is no other open door, the CPU 31 goes to step S74.

Figure 15:
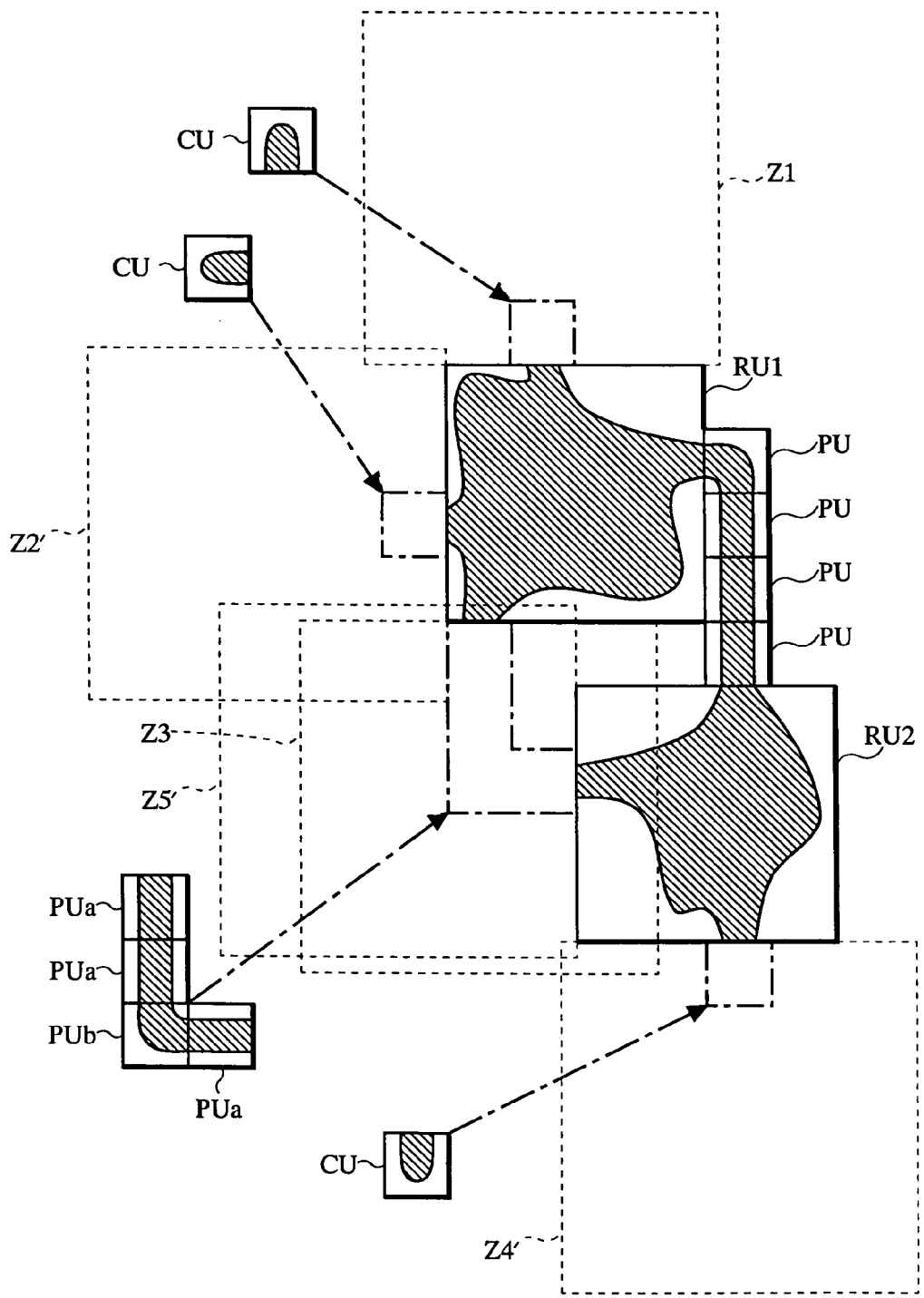
FIG. 15 is an illustration for describing one example of a unit connection process performed by a CPU 31 of FIG. 2.

In step S73, the CPU 31 connects the open door selected in step S72 to the other open door located within the predetermined area via a passage unit PU, disposes the connection result on the map area, and then returns to step S71 for further processing. On the other hand, in step S74, the CPU 31 connects the open door selected in step S72 to a cap unit CU, disposes the connection result on the map area, and then returns to step S71 for further processing. Here, with reference to FIG. 15, the processes performed by the CPU 31 in steps S72 through S74 are described below. FIG. 15 is an illustration for describing one example of the unit connection process performed by the CPU 31.

In FIG. 15, when Yes is determined in step S6 of FIG. 9, two room units RU1 and RU2 are connected to each other via four passage units PU and are disposed on the map area. Of these two room units RU1 and RU2, the room unit RU1 has three open doors. From these open doors toward the direction of their opening, zones Z1 through Z3 each having a size of 10×10 are shown. In step S72, since the zones Z1 and Z2 include no open door, the CPU 31 determines those zones Z1 and Z2 as "there is no other open door". The CPU 31 then causes cap units CU to be disposed in portions (each indicated by a one-dot-chain line inside each of the zones Z1 and Z2) so that the cap units CU are respectively connected to the open doors corresponding to the zones Z1 and Z2.

On the other hand, the zone Z3 includes one open door of the room unit RU2. Therefore, in step S72, the CPU 31 determines the zone Z3 as "there is another open door". The CPU 31 then connects, in step S73, the open door of the room unit RU1 corresponding to the zone Z3 to the open door of the room unit RU2 within the zone Z3 with a passage unit PU. For example, in FIG. 15, three passage units PUa and one passage unit PUb are combined so as to connect the room units RU1 and RU2 together for disposition on a portion (indicated by one-dot-chain lines inside the zone Z3) on the map area.

On the other hand, the room unit RU2 has two open doors. From these open doors toward the direction of their opening, zones Z4 and Z5 are shown. In step S72, since the zone Z4 includes no open door, the CPU 31 determines the zone Z4 as "there is no other open door". The CPU 31 then causes a cap unit CU to be disposed on a portion (indicated by a one-dot-chain line inside the zone Z4) so that the cap unit CU is connected to the open door corresponding to the zone Z4.

On the other hand, the zone Z5 includes one open door of the room unit RU1. Therefore, in step S72, the CPU 31 determines the zone Z5 as "there is another open door". The CPU 31 then connects, in step S73, the open door of the room unit RU2 corresponding to the zone Z5 to the open door of the room unit RU1 within the zone Z5 with a passage unit PU. Here, the results obtained by disposing the passage unit PU through the determination with regard to the zone Z5 are identical to those obtained by disposing the passage unit PU through the determination with regard to the zone Z3. In the operation performed by the CPU 31 in steps S72 and S73, either one of the open doors is to be processed first. Therefore, the remaining open door is not processed after the one of the open doors is processed.

Figure 16:
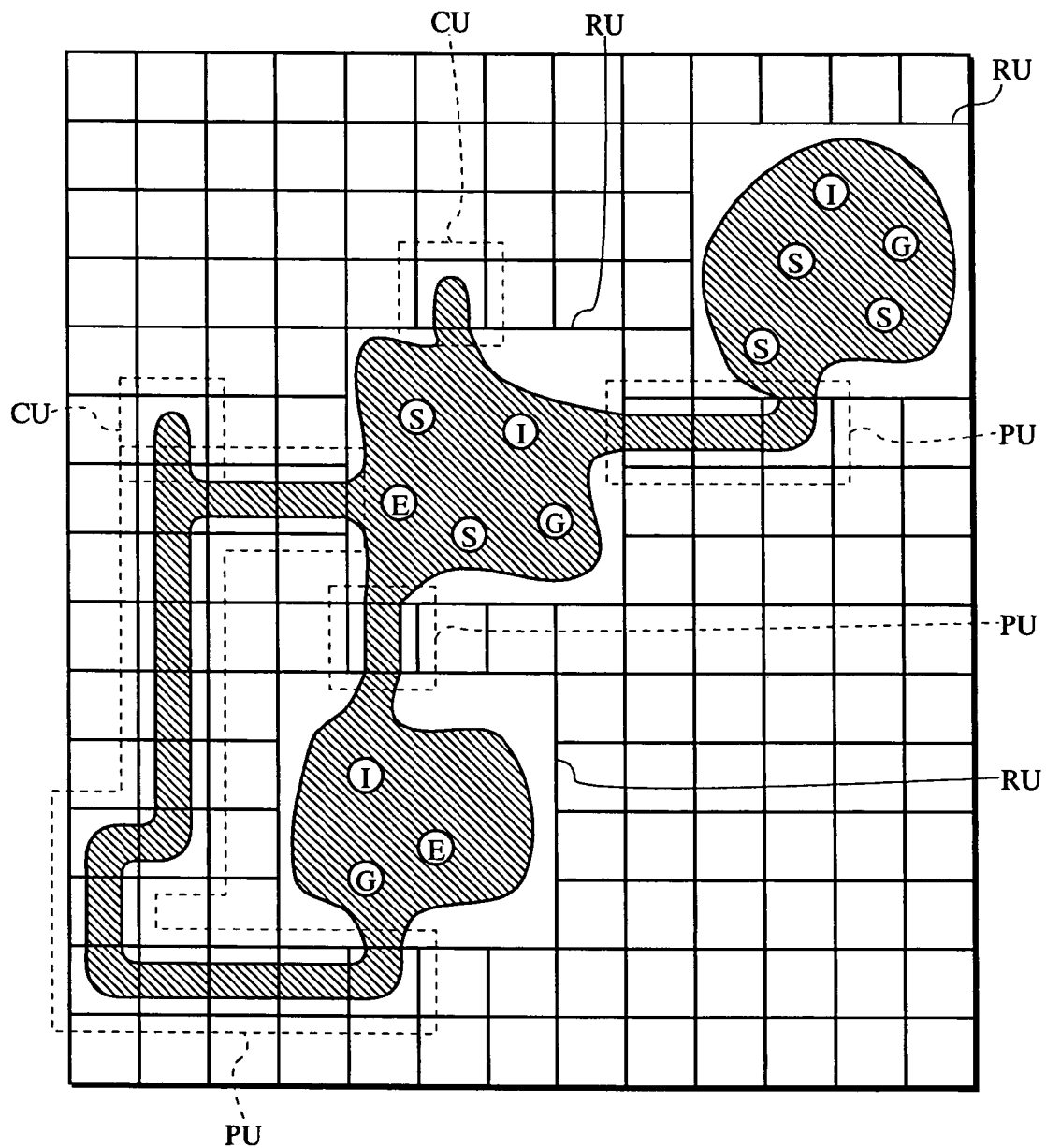
FIG. 16 is an illustration showing one non-limiting example of a maze generated in a map generation process performed by the CPU 31 of FIG. 2.

Referring back to FIG. 9, in step S8, the CPU 31 selects one start slot Ss included in the room unit RU disposed in step S3 on the map area, and sets the start slot Ss at a start point of the map. The CPU 31 then selects one goal slot Sg included in any room units RU disposed on the map area, sets the goal slot at a goal point of the map, and then ends the map generation process based on the flowchart. FIG. 16 is an illustration showing one example of the map generated in the map generation process. As illustrated in FIG. 16, in the map generation process, a new unit is always disposed on the map area so as to be connected to another unit. Therefore, all units are consecutive as one, and a map being divided into a plurality of groups is not generated. That is, areas where an object, such as the player object, can move or can be disposed are formed so as to be combined as one and to be closed. In the map illustrated in FIG. 16, three room units RU are connected via one passage unit PU. Each of the three room units RU includes a goal slot Sg. The CPU 31 arbitrarily selects one of these goal slots Sg, and sets the selected goal slot Sg at the goal point of the map.

As such, in the exemplary illustrative game machine, with the game program being executed, a map with diverse elements including elements of randomness can be automatically generated. Also, in the generated map, areas where an object, such as the player object, can move or can be disposed are formed so as to be combined as one and to be closed. Furthermore, by adjusting the selection coefficient SF, the disposition ratio of the units of two types (room units and passage units) included in the generated map can be controlled. Still further, by adjusting the multiplication factor M, the possibility that a unit of one type is connected to a unit of the other type for disposition can be controlled. That is, by adjusting the selection coefficient SF and the multiplication factor M, it is possible to generate a map in consideration of the ratio of the units of two types disposed on the map area and the affinity for connection between units of two types.

In the above description, each of the room unit, the passage unit, and the cap unit, which are unit zones forming a map, has a rectangular shape. However, the shape of each of these units is not limited to a rectangle. Each unit may have a polygonal shape, such as a regular hexagon, to achieve the present invention.

While the technology herein has been described in connection with exemplary illustrative non-limiting embodiment, the invention is not to be limited by the disclosure. The invention is intended to be defined by the claims and to cover all corresponding and equivalent arrangements whether or not specifically disclosed herein.

The invention claimed is:

1. A game machine for generating a game map which defines an area where an object can move in the course of a game, the game machine comprising:

at least one unit storage location having previously stored therein a first unit type, which is a unit zone including at least one connecting portion and forming the game map, and at least one second unit type, which is a unit zone including at least one connecting portion and is different in type from the first unit type;

first disposing programmed logic circuitry which selects one unit from the first unit type and the at least one second unit type that are stored in the at least one unit storage location, and disposes the selected unit on the map area; and second disposing programmed logic circuitry which repeats a process of selecting a unit which is connectable to an unconnected connecting portion included in a unit already disposed on the map area and a process of disposing the selected unit on the map area, wherein the second disposing programmed logic circuitry includes:

an unconnected connecting portion extractor which extracts the unconnected connecting portion from the connecting portions included in the unit already disposed on the map area;

a random number generator which generates a random number within a predetermined range;

a selection coefficient setter which sets a selection coefficient to the connecting portion extracted by the unconnected connecting portion extractor, said selection coefficient determining the probability that two different unit types will be connected and thus controlling the connection affinity between unit types;

a unit selector which compares the random number generated by the random number generator with the selection coefficient, and based at least in part on the result, selects one unit from the first unit type and the at least one second unit type; and a unit disposing mechanism which extracts the one unit selected by the unit selector from the first unit type and the at least one second unit type stored in the at least one unit storage location, connects a connecting portion included in the one unit to the connecting portion extracted by the unconnected connecting portion extractor, and disposes the one unit on the map area.

2. The game machine according to claim 1, wherein
the first unit type is a unit zone representing a passage on the game map, and
at least one of the at least one second unit types is a unit zone representing a room having an area larger than an area of the first unit on the game map.

3. The game machine according to claim 1, wherein
the selection coefficient setter sets different selection coefficients based on a type of a unit including the connecting portion extracted by the unconnected connecting portion extractor.

4. The game machine according to claim 1, wherein
the selection coefficient setter sets different selection coefficients based on the connecting portion extracted by the unconnected connecting portion extractor.

5. The game machine according to claim 1, wherein the at least one unit storage location has previously stored therein a first unit group formed by a plurality of the first unit types and at least one second unit group formed by a plurality of the at least one second unit types, the unit selector compares the random number with the selection coefficient based on the predetermined criteria, and selects one unit group from the first unit group and the at least one second unit group, and
the unit disposing mechanism extracts a unit from the one unit group selected by the unit selector from the first unit group and the at least one second unit group, and disposes the extracted unit on the map area.

6. The game machine according to claim 1, wherein when the connecting portion included in the one unit selected by the unit selector cannot be connected to the connecting portion extracted by the unconnected connecting portion extractor for disposing the one unit on the map area, the unit disposing mechanism extracts another unit from the first unit type and the at least one second unit type, connects a connecting portion included in the other unit to the connecting portion extracted by the unconnected connecting portion extractor, and disposes the another unit on the map area.

7. The game machine according to claim 6, wherein when the connecting portion included in the another unit cannot be connected to the connecting portion extracted by the unconnected connecting portion extractor for disposing the other unit on the map area, the unit disposing mechanism closes the connecting portion extracted by the unconnected connecting portion extractor.

8. The game machine according to claim 1, wherein
after the number of at least one second unit types disposed by the first and second disposing programmed logic circuitry on the map area has reached a predetermined number, the second disposing programmed logic circuitry stops disposing the at least one second unit types on the map area.

9. The game machine according to claim 1, further comprising
third disposing programmed logic circuitry which extracts, when the number of at least one second unit types disposed by the first and second disposing programmed logic circuitry on the map area has reached a predetermined number, a new unit of the first unit type stored in the at least one unit storage location, connects a connecting portion included in the new unit to the connecting portion extracted by the unconnected connecting portion extracting extractor, and disposes the new unit on the map area.

10. The game machine according to claim 9, wherein
when there is another unconnected connecting portion within a predetermined area on the map area with reference to the connecting portion extracted by the unconnected connecting portion extractor, the third disposing programmed logic circuitry disposes the new unit to connect the extracted connecting portion and the other unconnected connecting portion together via the new unit, and
when there is no other unconnected connecting portion within the predetermined area on the map area, the third disposing programmed logic circuitry closes the connecting portion extracted by the unconnected connecting portion extractor.

11. The game machine of claim 1, wherein a plurality of said first and at least one second unit types are disposed on the map area at the same time, the plurality of unit types forming the game map.

12. A non-transitory storage medium having stored therein a game program causing a computer to perform a process of generating a game map which defines an area where an object can move in the course of a game,
the computer having previously stored therein a first unit type, which is a unit zone including at least one connecting portion and forming the game map, and at least one second unit type, which is a unit zone including at least one connecting portion and is different in type from the first unit type, the game program causing the computer to perform the process comprising:
selecting one unit from the previously-stored first unit type and the at least one second unit type, and disposing the selected unit on the map area; and
repeating a process of selecting a unit which is connectable to an unconnected connecting portion included in a unit already disposed on the map area and a process of disposing the selected unit on the map area, wherein
the repeating includes:
extracting the unconnected connecting portion from the connecting portions included in the unit already disposed on the map area;
generating a random number within a predetermined range;
setting a selection coefficient to the connecting portion extracted in the extracting, said selection coefficient determining the probability that two different unit types will be connected and thus controlling the connection affinity between unit types;
comparing the random number generated in the random number generating step with the selection coefficient, and based at least in part on the result, selecting one unit from the first unit type and the at least one second unit type; and
extracting the one unit selected in the unit selecting step from the first unit type and the at least one second unit type previously stored, connecting a connecting portion included in the one unit to the connecting portion extracted in the extracting, and disposing the one unit on the map area.

13. The storage medium having stored therein the game program according to claim 12, wherein
the first unit type is a unit zone representing a passage on the game map, and
at least one of the at least one second unit types is a unit zone representing a room having an area larger than an area of the first unit on the game map.

14. The storage medium having stored therein the game program according to claim 12, wherein
  in the setting, different selection coefficients are set based on a type of a unit including the connecting portion extracted in the extracting.

15. The storage medium having stored therein the game program according to claim 12, wherein
  in the setting, different selection coefficients are set based on the connecting portion extracted in the extracting.

16. The storage medium having stored therein the game program according to claim 12, wherein
  the computer has previously stored therein a first unit group formed by a plurality of the first units and at least one second unit group formed by a plurality of the at least one second unit types,
  in the selecting, the random number is compared with the selection coefficient based on the predetermined criteria, and one unit group is selected from the first unit group and the at least one second unit group, and
  in the disposing, a unit is extracted from the one unit group selected in the unit selecting step from the first unit group and the at least one second unit group, and the extracted unit is disposed on the map area.

17. The storage medium having stored therein the game program according to claim 12, wherein
  in the disposing, when the connecting portion included in the one unit selected in the selecting cannot be connected to the connecting portion extracted in the extracting for disposing the one unit on the map area, another one unit is extracted from the first unit type and the at least one second unit type, a connecting portion included in the other unit is connected to the connecting portion extracted in the extracting, and the other unit is disposed on the map area.

18. The storage medium having stored therein the game program according to claim 17, wherein
  in the disposing, when the connecting portion included in the other unit cannot be connected to the connecting portion extracted in the extracting for disposing the other unit on the map area, the connecting portion extracted in the extracting is closed.

19. The storage medium having stored therein the game program according to claim 12, wherein
  in the repeating, after the number of at least one second unit types disposed in the first and second disposing steps on the map area has reached a predetermined number, disposing the at least one second unit types on the map area is stopped.

20. The storage medium having stored therein the game program according to claim 12, wherein the game program further causes the computer to perform a process of extracting, when the number of at least one second unit types disposed in the first and second disposing steps on the map area has reached a predetermined number, a new unit of the previously-stored first unit type, connecting a connecting portion included in the new unit to the connecting portion extracted by the extracting the unconnected connecting portion, and disposing the new unit on the map area.

21. The storage medium having stored therein the game program according to claim 20, wherein
  in the extracting a new unit,
  when there is another unconnected connecting portion within a predetermined area on the map area with reference to the connecting portion extracted in the extracting the unconnected connecting portion, the new unit is disposed to connect the extracted connecting portion and the other unconnected connecting portion together via the new unit, and
  when there is no other unconnected connecting portion within the predetermined area on the map area, the connecting portion extracted in the extracting the unconnected connecting portion is closed.

22. The storage medium of claim 12, wherein a plurality of said first and at least one second unit types are disposed on the map area at the same time, the plurality of unit types forming the game map.

23. A method of dynamically generating a game map on a game machine by assembling a variable number of building pieces, said pieces including a plurality of unit types including at least an area unit type and at least a connection unit type, wherein each of the units is provided with at least one opening for connection to another unit, the method comprising:
  deploying a unit on a game map of the game machine;
  choosing an unconnected opening of a deployed unit, said unconnected opening having a selection coefficient assigned thereto;
  generating a random number;
  selecting, based at least in part on said random number and said selection coefficient and from amongst said plurality of unit types, a unit type to be connected to the unconnected opening, said selection coefficient determining the probability that two different unit types will be connected and thus controlling the connection affinity between said plurality of unit types;
  deploying and connecting an opening of the randomly selected unit type to the unconnected opening;
  repeating the choosing, assigning, randomly selecting, and deploying and connecting until a determined number of area units has been deployed on the game map of the game machine; and
  once the selected number of area units has been deployed, connecting or sealing off unconnected openings remaining on the units deployed on the game map of the game machine.

24. The method of claim 23, wherein each unit type includes a plurality of different units, and wherein the randomly selecting further includes randomly choosing, from the plurality of different units of the randomly determined unit type, a unit to be connected to the unconnected opening.

25. The method of claim 23, wherein the method further includes:
  varying the selection coefficient based at least in part on the unit type to which the unconnected opening belongs.

26. The method of claim 23 including assigning a predetermined weighting factor as said selection coefficient.

\* \* \* \* \*